US012606302B2

(12) United States Patent
Echols et al.

(10) Patent No.: US 12,606,302 B2
(45) Date of Patent: Apr. 21, 2026

(54) WING-IN-GROUND EFFECT VEHICLES AND USES THEREOF

(71) Applicant: LeVanta Tech Inc., Springfield, MO (US)

(72) Inventors: Kelly A. Echols, Monett, MO (US); Randall Petersen, Salt Lake City, UT (US)

(73) Assignee: LeVanta Tech Inc., Springfield, MO (US)

( * ) Notice: Subject to any disclaimer, the term of this patent is extended or adjusted under 35 U.S.C. 154(b) by 0 days.

(21) Appl. No.: 18/913,727

(22) Filed: Oct. 11, 2024

(65) Prior Publication Data

US 2025/0346350 A1     Nov. 13, 2025

Related U.S. Application Data

(63) Continuation of application No. 18/049,588, filed on Oct. 25, 2022, now Pat. No. 12,221,210.

(60) Provisional application No. 63/368,335, filed on Jul. 13, 2022, provisional application No. 63/335,221, filed on Apr. 27, 2022, provisional application No. 63/271,589, filed on Oct. 25, 2021.

(51) Int. Cl.

| | |
|---|---|
| *B64C 35/00* | (2006.01) |
| *B60F 5/02* | (2006.01) |
| *B63B 79/10* | (2020.01) |
| *B64C 1/26* | (2006.01) |
| *B64C 3/14* | (2006.01) |
| *B64C 3/38* | (2006.01) |
| *B64C 9/24* | (2006.01) |

(52) U.S. Cl.
CPC .............. *B64C 35/006* (2013.01); *B60F 5/02* (2013.01); *B63B 79/10* (2020.01); *B64C 1/26* (2013.01); *B64C 3/14* (2013.01); *B64C 3/38* (2013.01); *B64C 9/24* (2013.01)

(58) Field of Classification Search
CPC ........... B64C 35/006; B64C 1/26; B64C 3/14; B64C 3/38; B64C 9/24; B60F 5/02; B63B 79/10
See application file for complete search history.

(56) References Cited

U.S. PATENT DOCUMENTS

| | | | |
|---|---|---|---|
| 3,051,413 | A | 8/1962 | Pouit |
| 3,161,377 | A | 12/1964 | Helmut |
| 3,361,386 | A | 1/1968 | Smith |
| 3,908,783 | A | 9/1975 | Joerg et al. |

(Continued)

FOREIGN PATENT DOCUMENTS

| | | | |
|---|---|---|---|
| CA | 2246723 | A1 | 8/1997 |
| CN | 108725777 | A | 11/2020 |

(Continued)

OTHER PUBLICATIONS

PCT International Search Report for PCT/US2022/046767, mailing date Dec. 6, 2021, 2 pages.

(Continued)

*Primary Examiner* — Assres H Woldemaryam
(74) *Attorney, Agent, or Firm* — Caldwell LLC

(57) ABSTRACT

Wing-in-ground effect (WIG) vehicles are disclosed herein. Hovercraft takeoff and landing modes are disclosed herein. Uses of WIG vehicles, including for maritime monitoring, are disclosed herein.

20 Claims, 29 Drawing Sheets

(56) References Cited

U.S. PATENT DOCUMENTS

| | | | | |
|---|---|---|---|---|
| 4,151,893 A * | 5/1979 | Mantle | B60V 1/22 | 180/126 |
| 4,442,986 A * | 4/1984 | Rousseau | B64C 21/02 | 180/116 |
| 4,485,992 A * | 12/1984 | Rao | B64C 9/24 | 244/214 |
| 5,255,881 A * | 10/1993 | Rao | B64C 21/04 | 244/199.1 |
| 5,518,204 A * | 5/1996 | Tracy | B64C 23/04 | 244/45 R |
| 5,566,775 A | 10/1996 | Schoell | | |
| 5,697,468 A * | 12/1997 | Russell, Jr. | B60V 1/22 | 180/118 |
| 5,772,155 A * | 6/1998 | Nowak | B64C 23/06 | 244/200.1 |
| 6,318,677 B1 * | 11/2001 | Dixon | B64C 23/06 | 244/214 |
| 6,860,449 B1 | 3/2005 | Chen | | |
| 7,032,861 B2 | 4/2006 | Sanders, Jr. | | |
| 7,108,230 B2 * | 9/2006 | Clark | B64C 5/08 | 244/45 R |
| 7,188,580 B1 * | 3/2007 | Borman | B60V 1/08 | 114/283 |
| 7,249,732 B2 | 7/2007 | Sanders, Jr. | | |
| 8,240,616 B2 * | 8/2012 | Miller | B64C 21/04 | 244/130 |
| 8,382,040 B2 * | 2/2013 | Hamilton | B64C 23/005 | D12/333 |
| 8,434,723 B2 * | 5/2013 | Simpson | F15D 1/003 | 366/337 |
| 8,579,227 B2 * | 11/2013 | Burnham | B64C 29/0025 | 244/12.5 |
| 9,694,907 B2 | 7/2017 | Simon et al. | | |
| 9,946,267 B2 | 4/2018 | Youmans | | |
| D875,021 S | 2/2020 | Nunes | | |
| 10,689,102 B2 | 6/2020 | Tovkach | | |
| 10,703,467 B2 | 7/2020 | Tovkach | | |
| 10,730,622 B2 | 8/2020 | Groninga | | |
| 10,807,656 B2 * | 10/2020 | Preiss | B62D 35/007 | |
| 2004/0094662 A1 | 5/2004 | Sanders | | |
| 2006/0049304 A1 | 3/2006 | Sanders | | |
| 2007/0034738 A1 | 2/2007 | Sanders | | |
| 2010/0140389 A1 * | 6/2010 | Gleed | B64C 3/40 | 244/12.6 |
| 2012/0237341 A1 * | 9/2012 | Simon | B64C 3/14 | 415/211.2 |
| 2017/0174335 A1 | 6/2017 | Malloy | | |
| 2018/0178907 A1 | 6/2018 | Tovkach | | |
| 2018/0272856 A1 | 9/2018 | Manning | | |
| 2018/0354609 A1 | 12/2018 | Renteria | | |
| 2018/0362160 A1 | 12/2018 | Groninga | | |
| 2019/0016453 A1 | 1/2019 | Skulskis | | |
| 2019/0023389 A1 | 1/2019 | Murrow | | |
| 2019/0121371 A1 | 4/2019 | Russell | | |
| 2019/0168866 A1 | 6/2019 | Tovkach | | |
| 2019/0256200 A1 | 8/2019 | Neff | | |
| 2019/0302802 A1 | 10/2019 | Misfeldt | | |
| 2019/0302803 A1 | 10/2019 | Misfeldt | | |
| 2020/0055585 A1 * | 2/2020 | Hung | B64C 9/12 | |
| 2020/0062392 A1 | 2/2020 | Yoon | | |
| 2020/0064443 A1 | 2/2020 | Yoon | | |

FOREIGN PATENT DOCUMENTS

| | | |
|---|---|---|
| CN | 110341933 A | 6/2024 |
| DE | 10331661 A1 | 1/2005 |
| DE | 202018104519 U1 | 9/2019 |
| DE | 102018113265 A1 | 12/2019 |
| EP | 3415423 A1 | 12/2018 |
| EP | 3492377 A1 | 6/2019 |
| EP | 3415423 B1 | 11/2019 |
| GB | 951186 A | 3/1964 |
| GB | 2347909 A | 11/2000 |
| WO | 1997030886 A1 | 8/1998 |
| WO | 2004065208 A2 | 8/2004 |
| WO | 2005072233 A2 | 8/2005 |
| WO | 2015145101 A1 | 10/2015 |
| WO | 2016022040 A1 | 2/2016 |
| WO | 2017030462 A1 | 2/2017 |
| WO | 2017049135 A1 | 3/2017 |
| WO | 2017173159 A1 | 10/2017 |
| WO | 2018021943 A1 | 2/2018 |
| WO | 2018196041 A1 | 11/2018 |
| WO | 2019244892 A1 | 12/2019 |
| WO | 2019244893 A1 | 12/2019 |
| WO | 2020031511 A1 | 2/2020 |
| WO | 2022040463 A1 | 2/2022 |

OTHER PUBLICATIONS

PCT Search History for PCT/US2021/046767, date of Search, Oct. 29, 2021, 4 pages.

PCT Written Opinion of the International Searching Authority, mailing date Dec. 6, 2021, 7 pages.

* cited by examiner

100

110  112

120

115  113  125  114

100

131

110

114

100a

140

110

WING-IN-GROUND EFFECT VEHICLES AND USES THEREOF

CROSS-REFERENCE TO RELATED APPLICATIONS

This application is a continuation of U.S. patent application Ser. No. 18/049,588, filed Oct. 25, 2022, and titled "WING-IN-GROUND EFFECT VEHICLES AND USES THEREOF," which in turn claims the benefit of U.S. Provisional Patent Application No. 63/368,335, filed Jul. 13, 2022, and titled "AIRFOILS AND VEHICLES INCORPORATING THE SAME AND METHODS OF USE," U.S. Provisional Patent Application No. 63/335,221, filed Apr. 27, 2022, and titled "AIRFOILS AND VEHICLES INCORPORATING THE SAME AND METHODS OF USE," and U.S. Provisional Patent Application No. 63/271,589, filed Oct. 25, 2021, and titled "WING-IN-GROUND EFFECT VEHICLES," the contents of each of which are incorporated herein in their entirety.

COPYRIGHT NOTICE

TECHNICAL FIELD

The present disclosure relates to aerospace technology, in particular to wing-in-ground effect vehicles and uses thereof.

BACKGROUND

Airfoils and vehicles incorporating the same and methods of use are disclosed in WO2022040463. Additional wing-in-ground effect (WIG) vehicles, beyond what is disclosed in WO2022040463, would be beneficial, as well as additional methods of using WIG vehicles.

BRIEF DESCRIPTION OF THE DRAWINGS

Non-limiting embodiments of the present disclosure are illustrated in the accompanying drawings, in which:

FIG. 15 illustrates a cross-sectional slice of the airfoil 200a.

FIG. 21 illustrates a perspective view from above of another embodiment of a vehicle disclosed herein, vehicle 300a.

FIG. 22 illustrates an underneath perspective view of the vehicle 300a.

DETAILED DESCRIPTION

Figure 1:
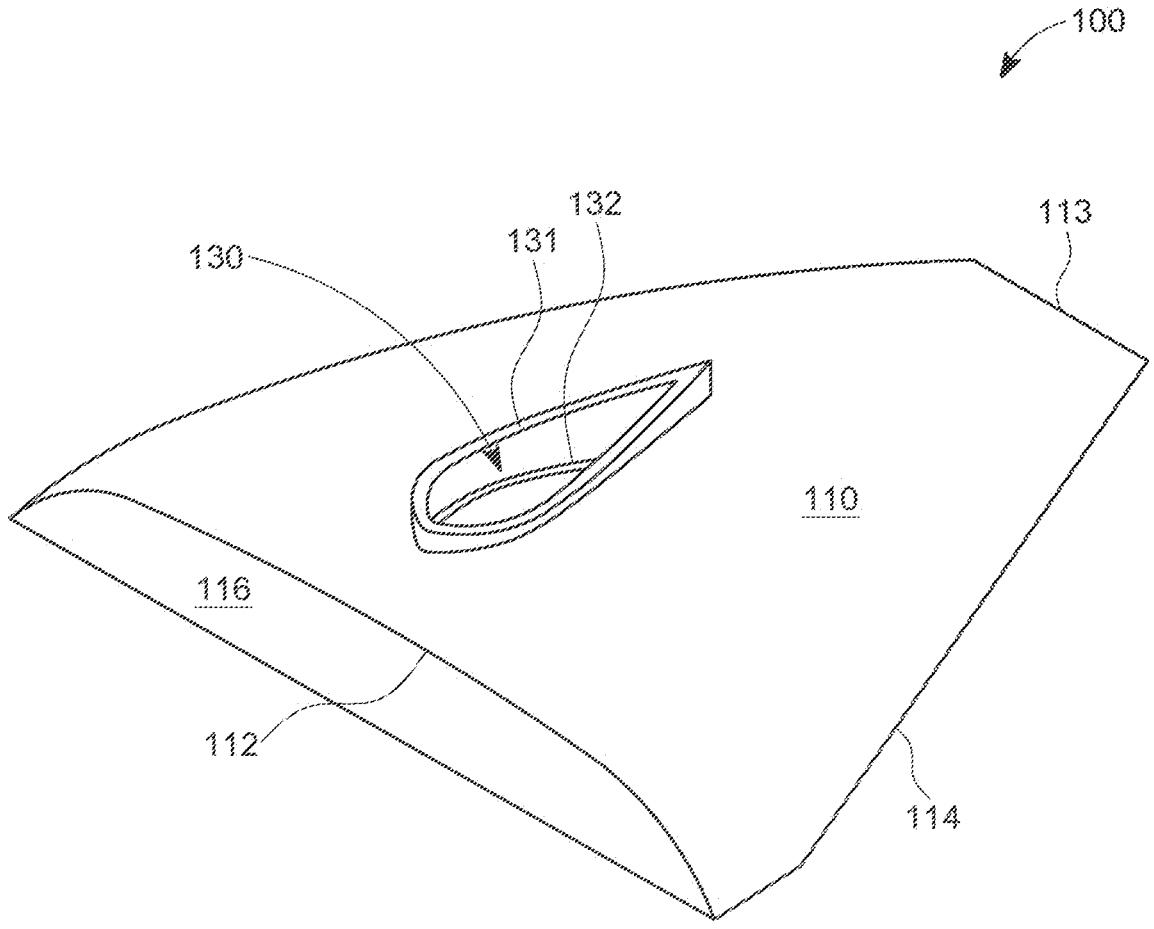
FIG. 1 illustrates a perspective view of one embodiment of an airfoil disclosed herein, airfoil 100.

The contents of WO2022040463, including the claims, are incorporated herein in their entirety.

Disclosed herein are airfoils and vehicles incorporating the same.

Rotary-wing aircraft, such as the quadcopters commonly used as drones, have the benefit of vertical take-off and landing (VTOL); however, they tend to have limited range due to inefficiencies associated with horizontal movement. Fixed wing aircraft are more efficient at horizontal movement and tend to have better range and speed than rotary-wing aircraft. However, fixed-wing aircraft typically need runways for take-off and landing.

The airfoils disclosed herein can be used for hovering, ground effect flight, and flight above ground effect. The airfoils utilize blown air (or another fluid, such as an exhaust gas) for hovering. As forward movement is engaged, the airfoil design provides lift. In certain embodiments, the blown air can be turned off or directed elsewhere, when sufficient forward speeds are achieved to provide all of the necessary lift. Vehicles incorporating the airfoils disclosed herein can approach the efficiencies and range of fixed wing aircraft (or perhaps exceed those efficiencies when flying in ground effect), but with instantaneous hover capability, removing the need for a runway.

The phrases "operably connected to," "connected to," "coupled to," "operatively connected," or "operative connection" refer to any form of interaction between two or more entities, including mechanical, electrical, magnetic, electromagnetic, fluid, and thermal interaction. Likewise, "fluidically connected to" or "fluidically connecting" refers to any form of fluidic interaction between two or more entities. Two entities may interact with each other even though they are not in direct contact with each other. For example, two entities may interact with each other through an intermediate entity.

The term "proximal" is used herein to refer to "near" or "at" the object disclosed.

The airfoil has an upper surface and a lower surface and is configured for operative connection to an airframe via the upper surface of the airfoil. The airfoil has a channel extending from the upper surface to the lower surface of the airfoil, wherein the channel is configured for fluidic communication with one or more blowers. The upper surface and the lower surface preferably extend laterally to first and second arcuate wingtips defining a concave region bounded by the lower surface of the airfoil. The airfoil may include a nozzle extending downward from the lower surface of the airfoil in fluidic communication with the channel of the airfoil. The nozzle may be extendable and retractable.

Vehicles including the airfoils may have an airframe operatively connected to one or more blowers. Fluid provided by the one or more blowers into the channels of each of the airfoils generates lift for the vehicles. In particular, the blowers may supply fluid with sufficient pressure to facilitate hover of the vehicles.

The channel may include a straight tube. Alternatively, the channel includes a swept tube wherein a lower orifice of the channel is offset relative to an upper orifice of the channel.

The airfoil can include a selectively openable vent located in the upper surface of the airfoil and rearward of an upper orifice of the channel and wherein the vent is in fluidic communication with the channel, whereby when the vent is in an open position, fluid provided into the channels exits at least partially through the vent and over the upper surface of the airfoil.

In some embodiments, a centerline of the airfoil has a stationary angle of attack of 5° to 25°, of 5° to 20°, of 5° to 15°, of 10° to 20°, or of 10° to 15°. In contrast, the first and second arcuate wingtips may have a stationary angle of attack of zero or near zero.

Methods of hovering a vehicle are also disclosed herein. The methods include providing multiple airfoils operably connected to an airframe of a vehicle, wherein each airfoil comprises an upper surface and a lower surface extending laterally to first and second arcuate wingtips defining a concave region bounded by the lower surface of the airfoil. Each airfoil is configured for operative connection to the airframe via the upper surface of the airfoil. The airfoil includes a channel extending through the upper surface and the lower surface of the airfoil, wherein an upper orifice of the channel is configured for fluidic communication with one or more blowers. Blowing via the one or more blowers a fluid through the channel with sufficient volume and pressure to lift the vehicle off of a surface. The airfoil is designed such that moving the vehicle forward directs atmospheric air over and under each of the airfoils and provides additional lift for the vehicle.

Figure 2:
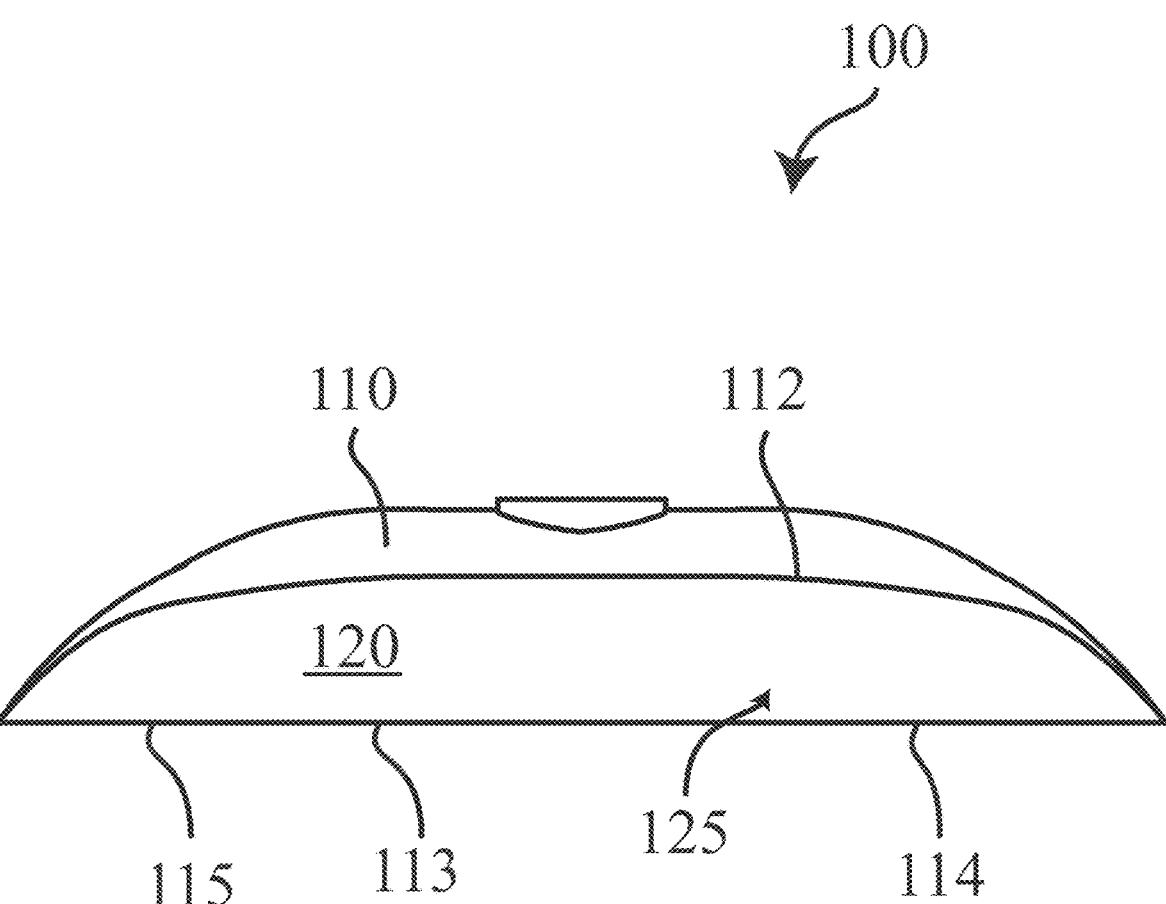
FIG. 2 illustrates a front view of the airfoil 100.
Figure 3:
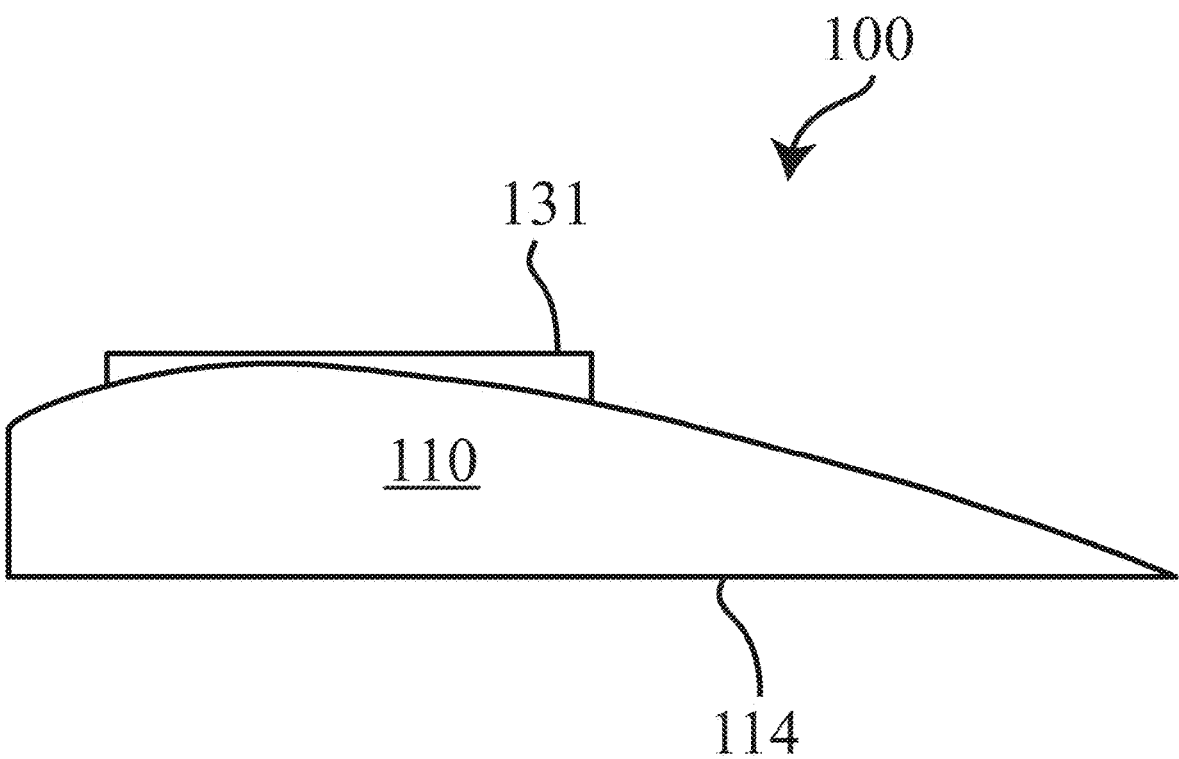
FIG. 3 illustrates a side view of the airfoil 100.
Figure 4:
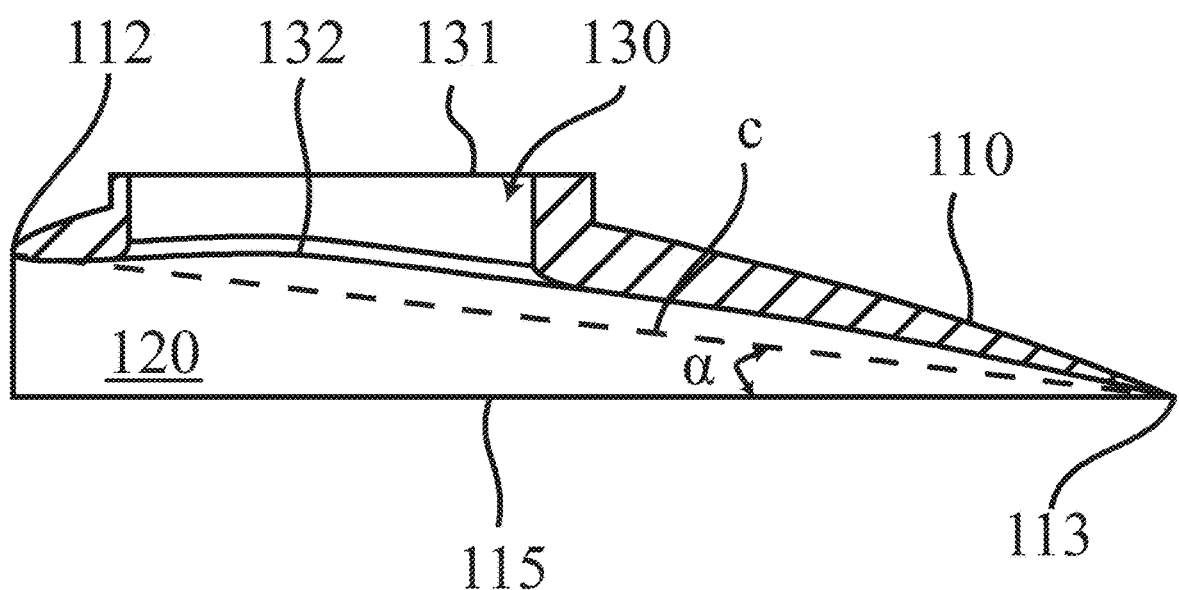
FIG. 4 illustrates a cross-sectional side view of the airfoil 100 taken along the lateral centerline of the airfoil 100.
Figure 5:
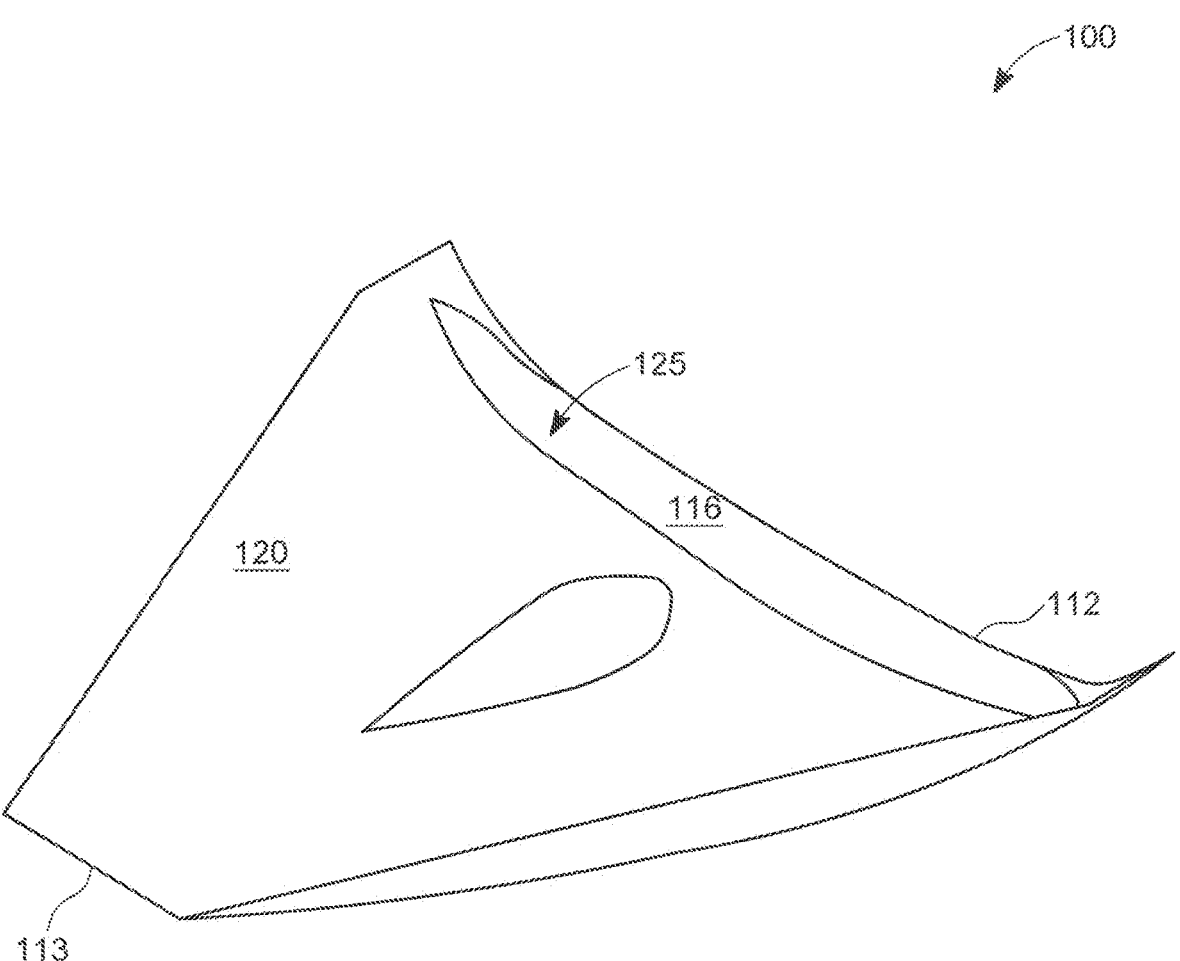
FIG. 5 illustrates an underneath perspective view of the airfoil 100.

FIG. 1 illustrates a perspective view of one embodiment of an airfoil disclosed herein, airfoil 100. FIG. 2 illustrates a front view of the airfoil 100. FIG. 3 illustrates a side view of the airfoil 100. FIG. 4 illustrates a cross-sectional side view of the airfoil 100 taken along the centerline of the airfoil 100. FIG. 5 illustrates an underneath perspective view of the airfoil 100.

The airfoil 100 has an upper surface 110 and a lower surface 120 and is configured for operative connection to an airframe via the upper surface 110 of the airfoil 100. The airfoil 100 has a channel 130 extending from the upper orifice 131 in the upper surface 110 to the lower orifice 131 in the lower surface 120 of the airfoil 100. The channel 130 is configured for fluidic communication with one or more blowers. For example, fresh air or exhaust gas supplied by blowers may be blown through the channel 130.

The upper surface 110 and the lower surface 120 extend laterally to first arcuate wingtip 114 and second arcuate wingtip 115. The camber of the airfoil 100 from the leading edge 112 to the trailing edge 113 combined with the curvature of the first and second arcuate wingtips 114 and 115, defines a concave region 125 bounded by the lower surface 120 of the airfoil 100.

In the airfoil 100, the upper orifice 131 protrudes upwards from the upper surface 110. In other variations, the upper orifice 131 may be flush with the upper surface 110. The upper orifice may be operably connected to an airframe and/or a blower via a flange, a rigid aerotube (i.e., aerodynamic structural tube that both provides mechanical attachment to the airframe and fluidic connection with the blower), flexible tubing, or other structure for conveying fluid from a blower to the channel 130.

In the airfoil 100, the channel 130 is a straight tube.

As can be seen in FIG. 4, the centerline of the airfoil 100 has a stationary angle of attack of 7° (i.e., alpha equals) 7°. The stationary angle of attack refers to the angle of attack of the airfoil when the airfoil is not moving, such as when an aircraft utilizing the airfoil is stationary. The angle of attack is the angle of imaginary line "c," the "chord line," extending from the leading edge 112 to the trailing edge 113 relative to horizontal. For the airfoil 100, the first and second arcuate wingtips 114 and 115 have a stationary angle of attack of zero. Or stated another way, the edges of the first and second arcuate wingtips 114 and 115 are horizontal when a vehicle utilizing the airfoil is stationary.

In the airfoil 100, the trailing edge 113 and the first and second arcuate wingtips 114 and 115 are separate edges that join at points. Alternatively, the trailing edge 113 can extend smoothly and continuously to the leading edge 112, such as in a continuous arc. This applies to all of the airfoil embodiments disclosed herein.

Fluid can be supplied through the channel 130 with sufficient volume and pressure to lift the airfoil 100 (and a vehicle attached thereto) off the surface. Additionally, as fluid exits the channel 130 and the airfoil 100 elevates, at least a portion of the fluid may accumulate in the concave region 125 and aid a pressure build up under the airfoil 100.

As the airfoil 100 moves forward (or air is otherwise horizontally directed against the airfoil 100), air is directed by "ram effect" into the concave region 125. Without wishing to be bound by theory, it is believed that at zero or low forward velocity, the airfoil 100 will hover over the surface and ride on a cushion of fluid supplied by the blowers through the channel 130. As the forward velocity increases, volume of fluid supplied through the channel 130 can be reduced. Additionally, as forward velocity increases, the airfoil 100 can transition from hover to flight.

Figure 6:
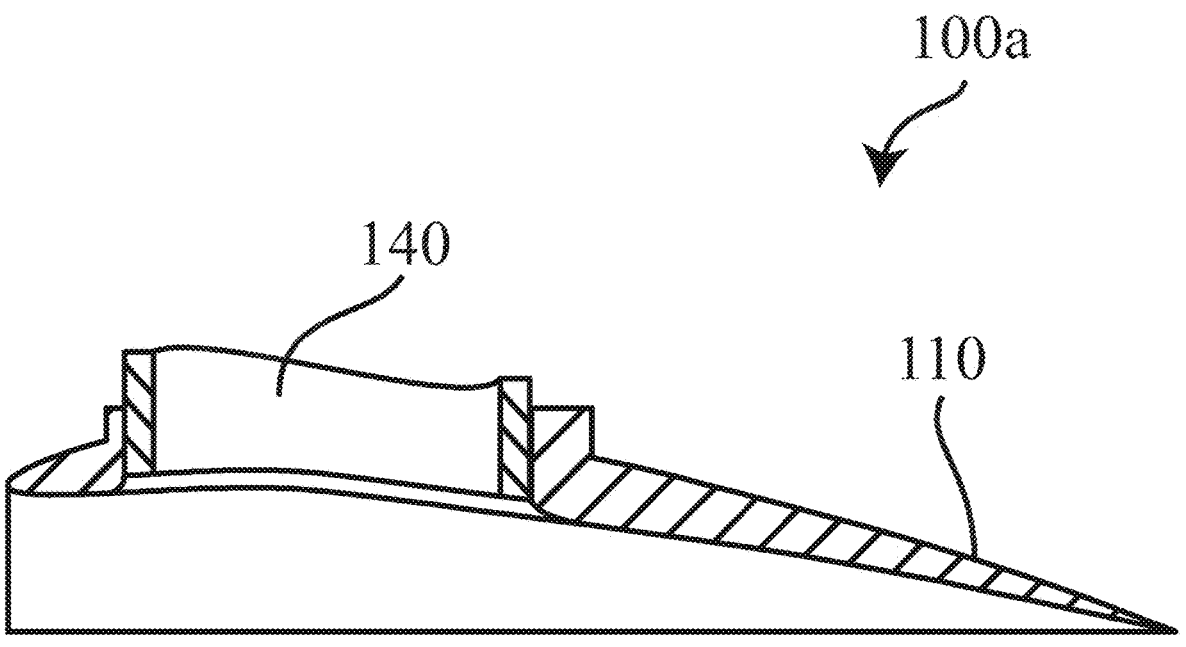
FIG. 6 illustrates a lateral centerline cross-sectional view of a variation of the airfoil 100.
Figure 7:
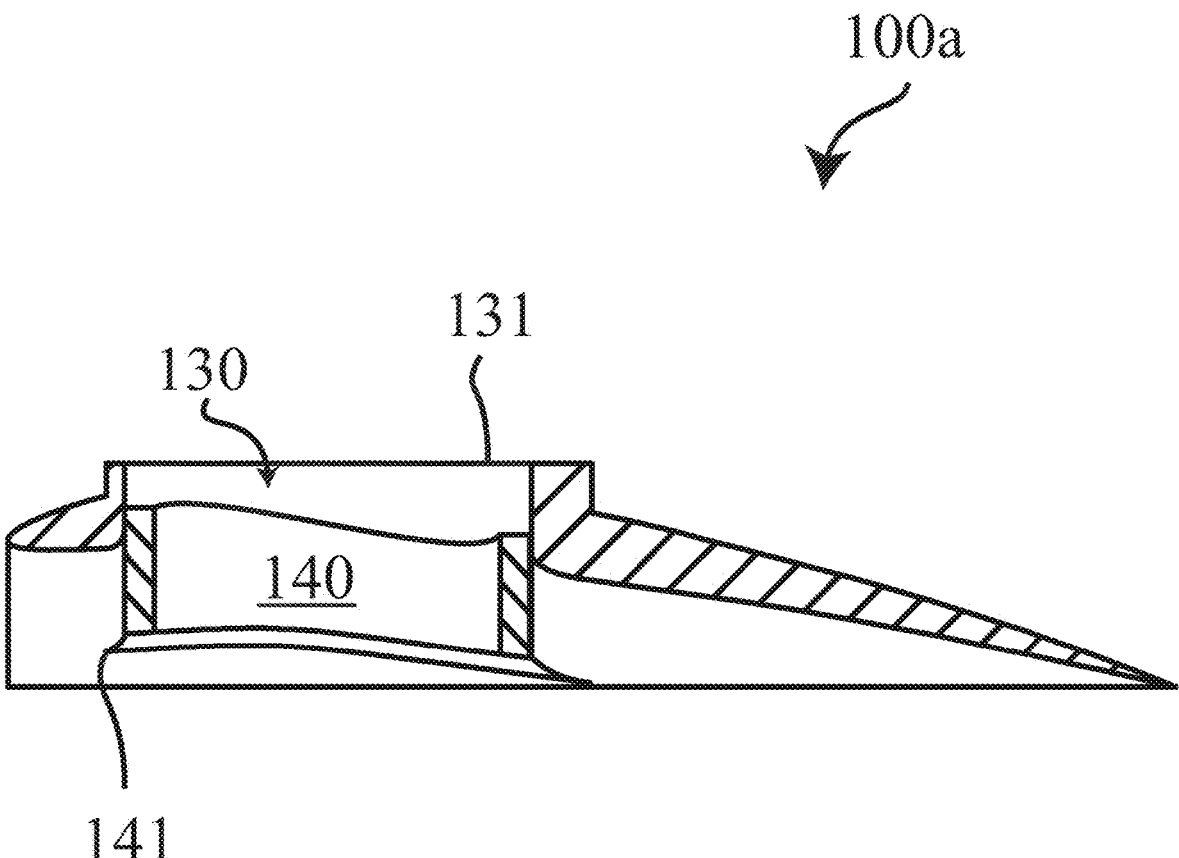
FIG. 7 illustrates a lateral centerline cross-sectional view of the airfoil 100a depicting the nozzle 140 extended from within the channel 130.
Figure 8:
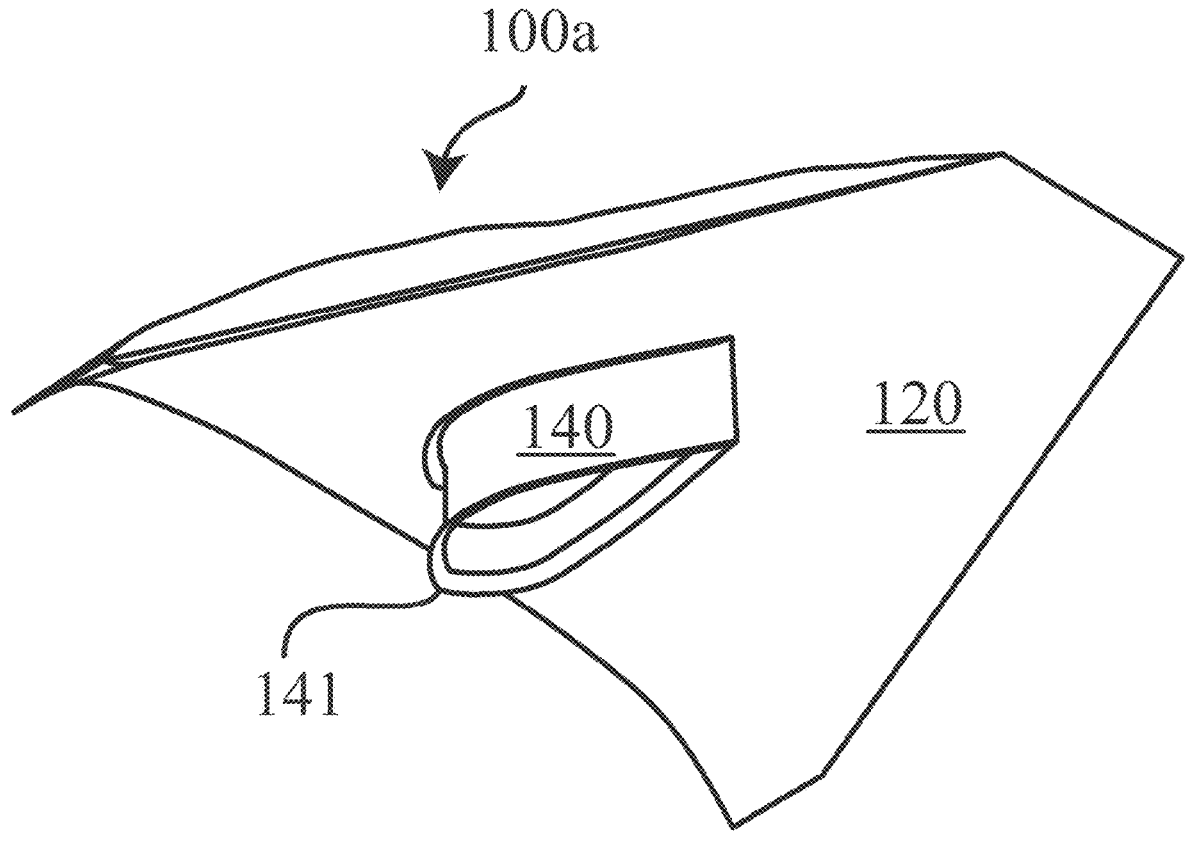
FIG. 8 illustrates an underneath perspective view of the airfoil 100a with the nozzle 140 extended.

FIGS. 6-8 illustrate a variation of the airfoil 100, airfoil 100a. Airfoil 100a includes an extendable and retractable nozzle 140. FIG. 6 illustrates a centerline cross-sectional view of the airfoil 100a depicting the nozzle 140 retracted within the channel 130. FIG. 7 illustrates a centerline cross-sectional view of the airfoil 100*a* depicting the nozzle 140 extended from within the channel 130. FIG. 8 illustrates an underneath perspective view of the airfoil 100*a* with the nozzle 140 extended.

In the airfoil 100*a*, the nozzle 140 extends close to the horizontal plane defined by the trailing edge 113 and the first and second arcuate wingtips 114 and 115. Alternatively, the nozzle 140 can be flush with the plane defined by those edges or it can extend beyond those edges. The nozzle 140 can direct fluid from one or more blowers towards a surface (such as the ground, water, or other takeoff surface). The nozzle 140 directs fluid from the channel 130 in close proximity to the surface. This may reduce the volume and/or pressure of the fluid needed to achieve hover.

As forward velocity increases, the nozzle 140 can be retracted and the airfoil 100*a* function the same as the airfoil 100. Alternatively, in other embodiments, the nozzle 140 is permanently extended.

In the airfoil 100*a*, the nozzle 140 includes a foot 141 at the end of the nozzle 140. The illustrated foot 141 aligns the end of the nozzle 140 with the lower surface 120. The illustrated nozzle 140 is an open tube and the foot 141 surrounds the perimeter. The foot 141 provides increased surface area proximal the end of the nozzle 140.

Instead of an open tube, the nozzle 140 and the foot 141 can be capped off. Fluid could be discharged from slits, holes, or other apertures in the underside of the foot 141. The foot 141 could be made of a flexible material that inflates with fluid blown through the nozzle 140 and deflates when fluid is not pushed into it.

The concept of the nozzle 140 and optionally the foot 141 can be used with any of the embodiments disclosed herein.

Figure 9:
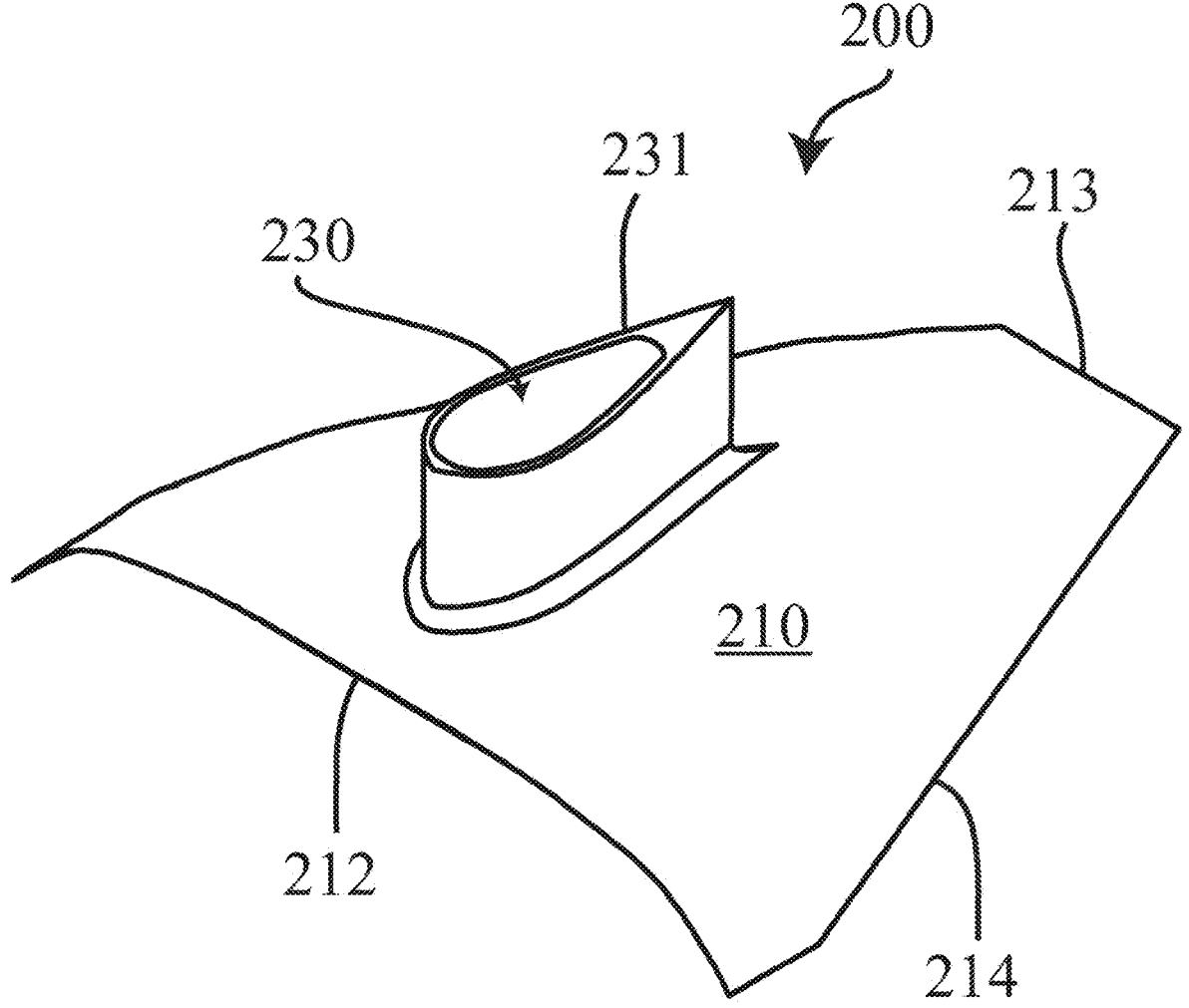
FIG. 9 illustrates a perspective view of one embodiment of an airfoil disclosed herein, airfoil 200.
Figure 10:
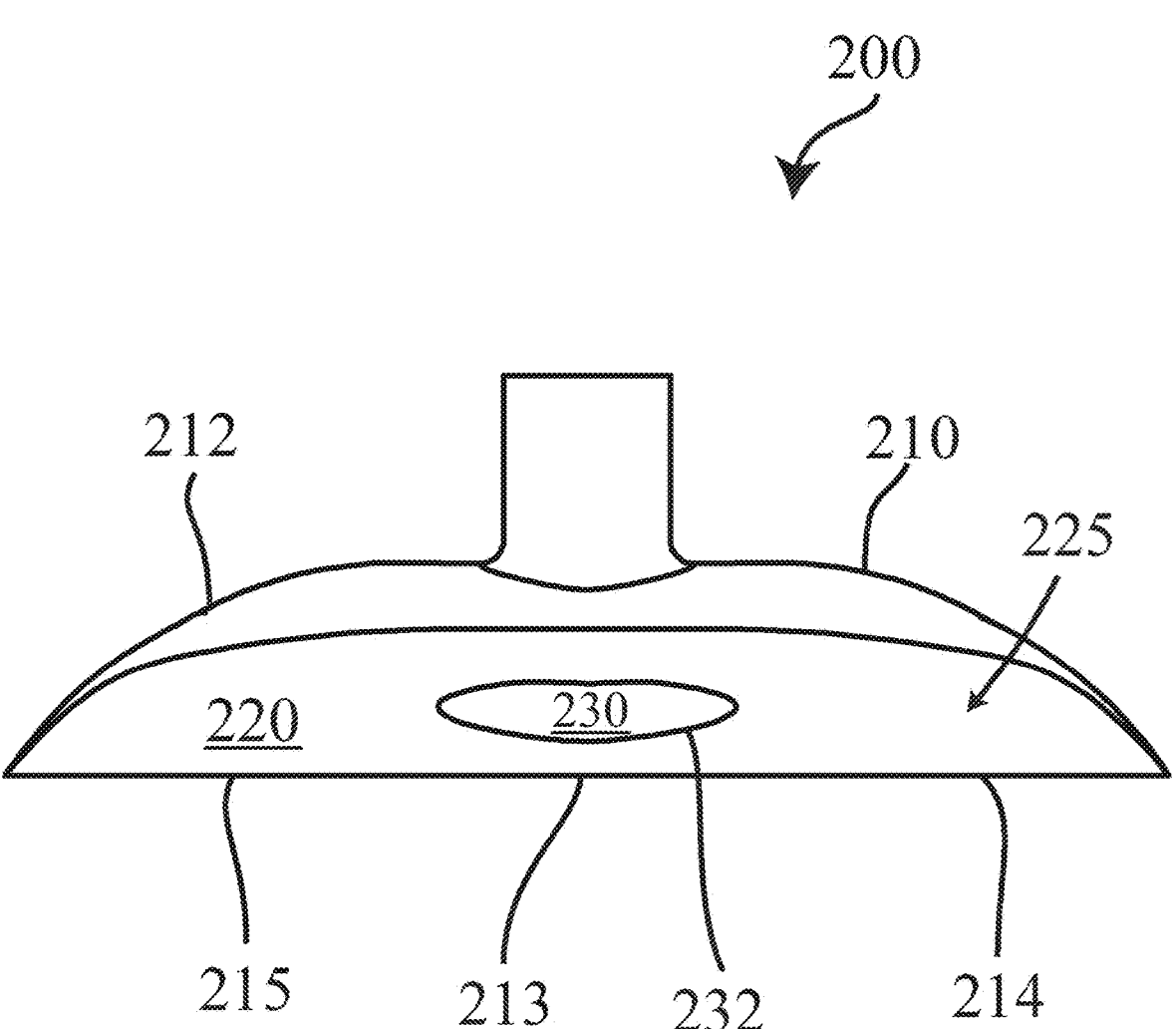
FIG. 10 illustrates a front view of the airfoil 200.
Figure 11:
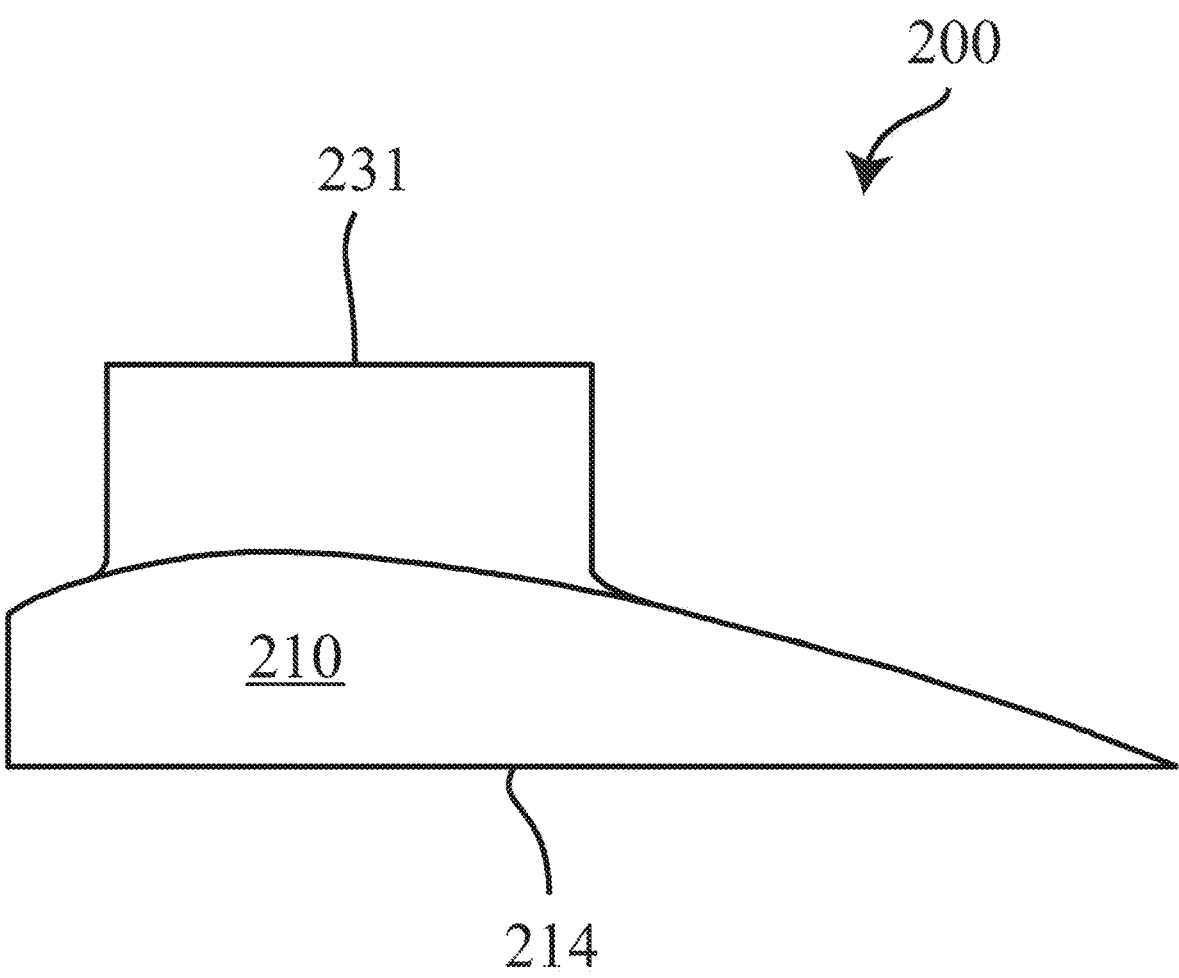
FIG. 11 illustrates a side view of the airfoil 200.
Figure 12:
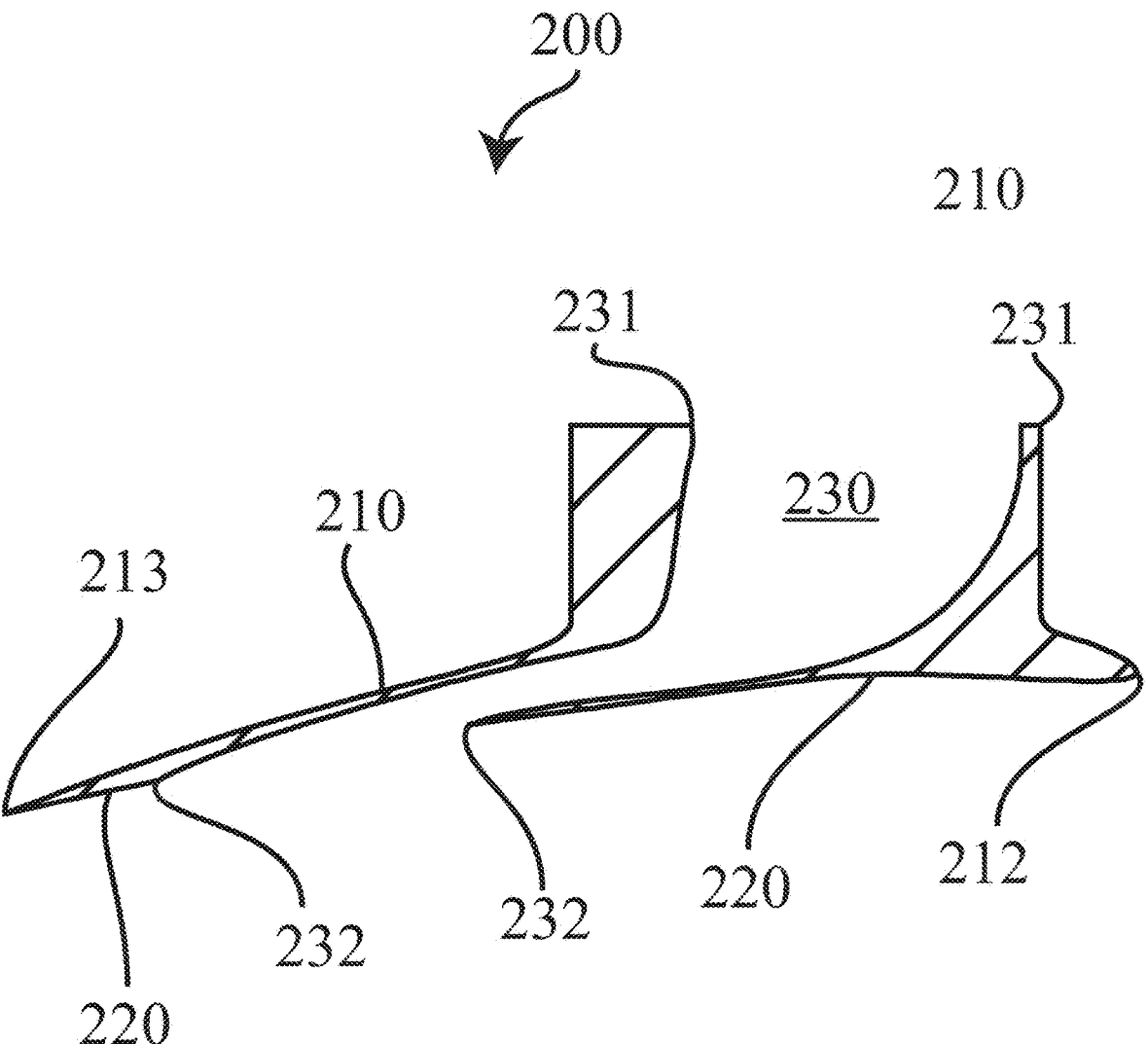
FIG. 12 illustrates a cross-sectional slice of the airfoil 200 taken along the lateral centerline of the airfoil 200.
Figure 13:
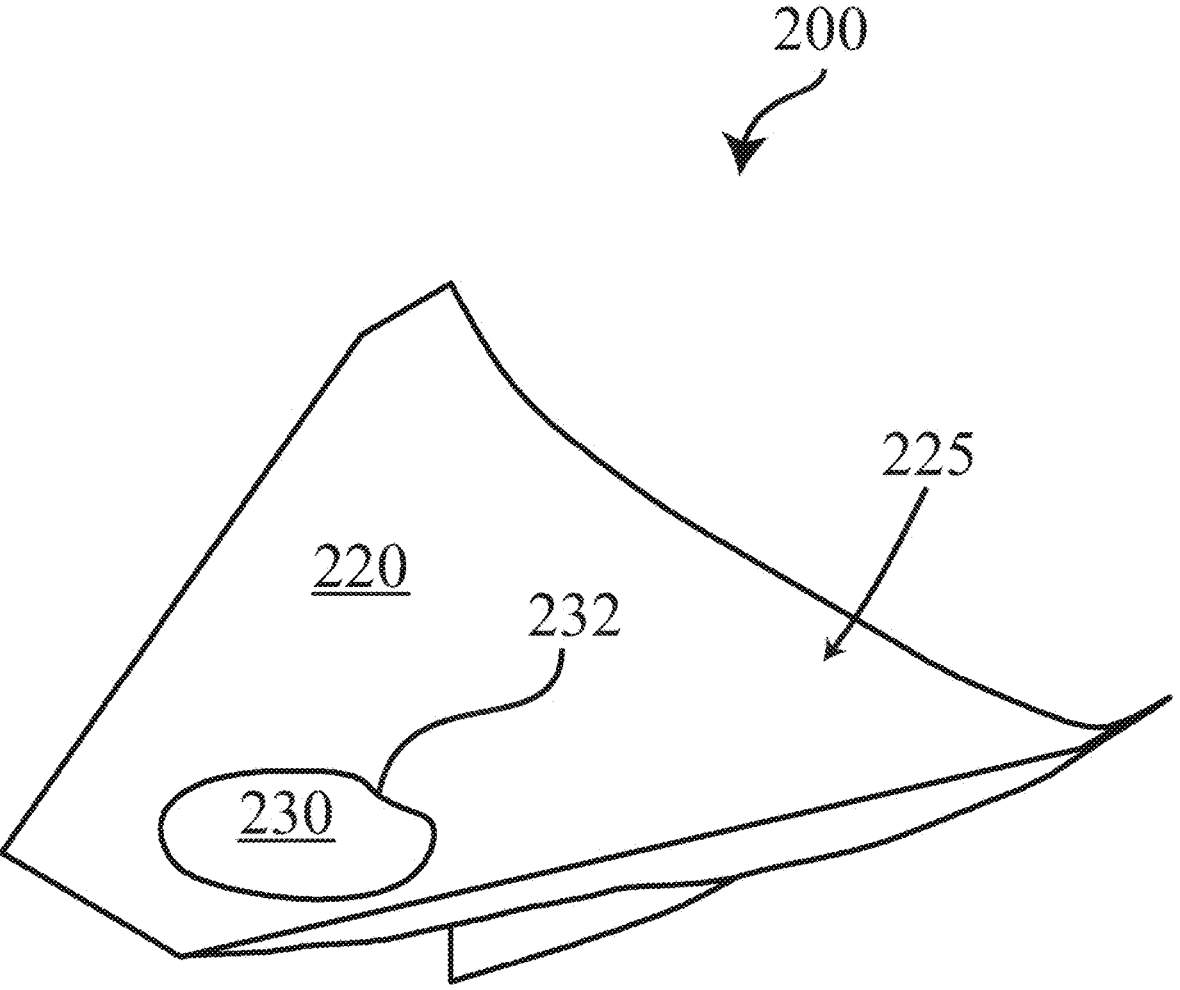
FIG. 13 illustrates an underneath perspective view of the airfoil 200.

FIG. 9 illustrates a perspective view of one embodiment of an airfoil disclosed herein, airfoil 200. FIG. 10 illustrates a front view of the airfoil 200. FIG. 11 illustrates a side view of the airfoil 200. FIG. 12 illustrates a cross-sectional slice of the airfoil 200 taken along the centerline of the airfoil 200. FIG. 13 illustrates an underneath perspective view of the airfoil 200.

The airfoil 200 has an upper surface 210 and a lower surface 220 and is configured for operative connection to an airframe via the upper surface 210 of the airfoil 200. The airfoil 200 has a channel 230 extending from the upper orifice 231 in the upper surface 210 to the lower orifice 231 in the lower surface 220 of the airfoil 200. The channel 230 is configured for fluidic communication with one or more blowers. For example, fresh air or exhaust gas supplied by blowers may be blown through the channel 230.

The upper surface 210 and the lower surface 220 extend laterally to first arcuate wingtip 214 and second arcuate wingtip 215. The camber of the airfoil 200 from the leading edge 212 to the trailing edge 213 combined with the curvature of the first and second arcuate wingtips 214 and 215, defines a concave region 225 bounded by the lower surface 220 of the airfoil 200.

In the airfoil 200, the upper orifice 231 protrudes upwards from the upper surface 210. In other variations, the upper orifice 231 may be flush with the upper surface 210. The upper orifice may be operably connected to an airframe and/or a blower via a flange, a rigid aerotube (i.e., aerodynamic structural tube that both provides mechanical attachment to the airframe and fluidic connection with the blower), flexible tubing, or other structure for conveying fluid from a blower to the channel 230.

In the airfoil 100, the channel 230 is a swept tube. The lower orifice 232 of the channel 230 is offset relative to the upper orifice 231.

The centerline of the airfoil 200 has a stationary angle of attack of 7°. For the airfoil 200, the first and second arcuate wingtips 214 and 215 have a stationary angle of attack of zero. Or stated another way, the edges of the first and second arcuate wingtips 214 and 215 are horizontal when a vehicle utilizing the airfoil is stationary.

In the airfoil 200, the trailing edge 213 and the first and second arcuate wingtips 214 and 215 are separate edges that join at points. Alternatively, the trailing edge 213 can extend smoothly and continuously to the leading edge 212, such as in a continuous arc.

Fluid can be supplied through the channel 230 with sufficient volume and pressure to lift the airfoil 200 (and a vehicle attached thereto) off a surface. Additionally, as fluid exits the channel 230 and the airfoil 200 elevates, at least a portion of the fluid may accumulate in the concave region 225 and aid a pressure build up under the airfoil 200.

As the airfoil 200 moves forward (or air is otherwise horizontally directed against the airfoil 200), air is directed by "ram effect" into the concave region 225. Without wishing to be bound by theory, it is believed that at zero or low forward velocity, the airfoil 200 will hover over the surface and ride on a cushion of fluid supplied by the blowers through the channel 230. As the forward velocity increases, volume of fluid supplied through the channel 230 can be reduced. Additionally, as forward velocity increases, the airfoil 200 can transition from hover to flight.

Figure 14:
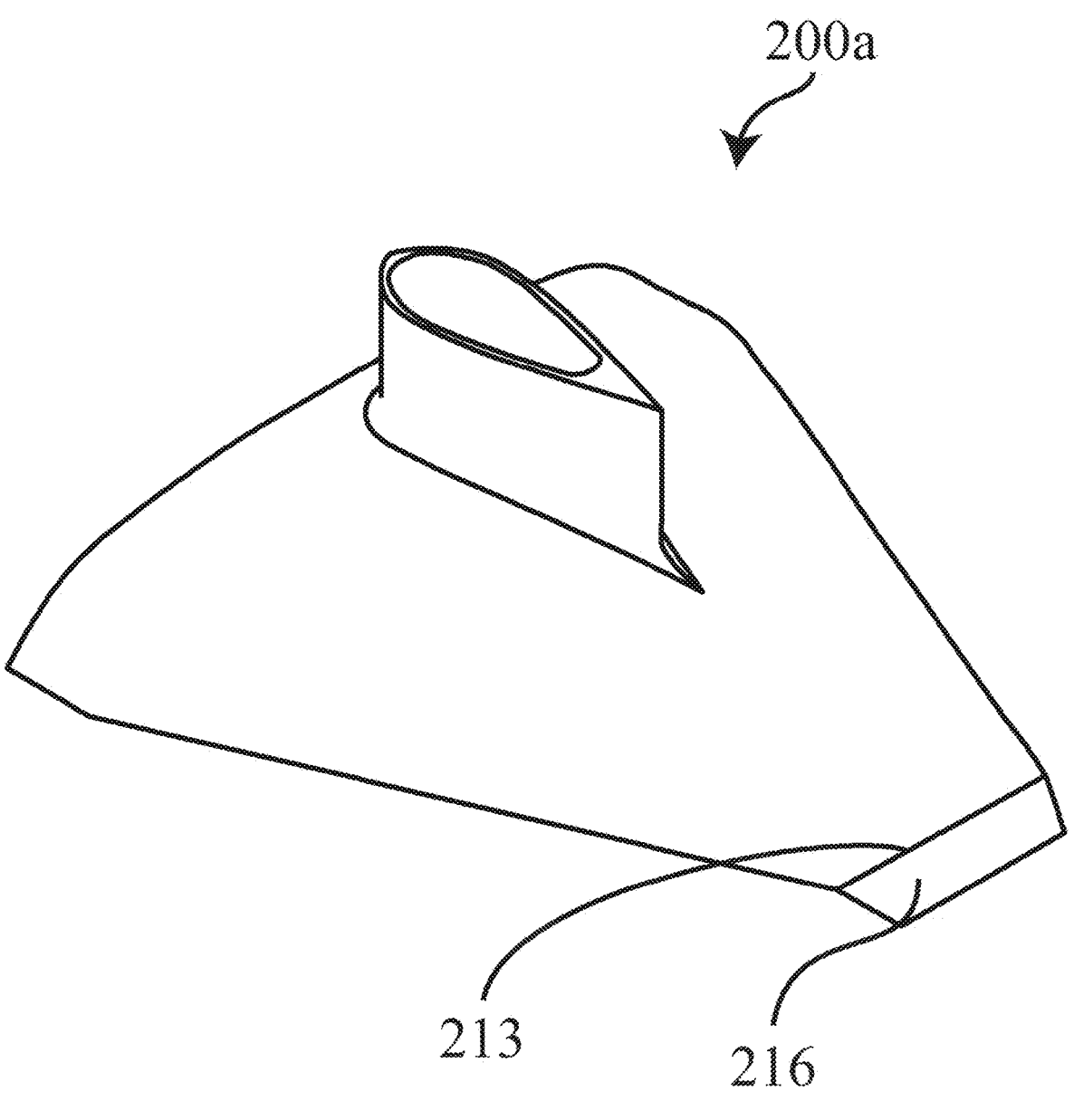
FIG. 14 illustrates a perspective view of a variation of the airfoil 200, the airfoil 200a, with the flap 216 downward oriented.
Figure 15:
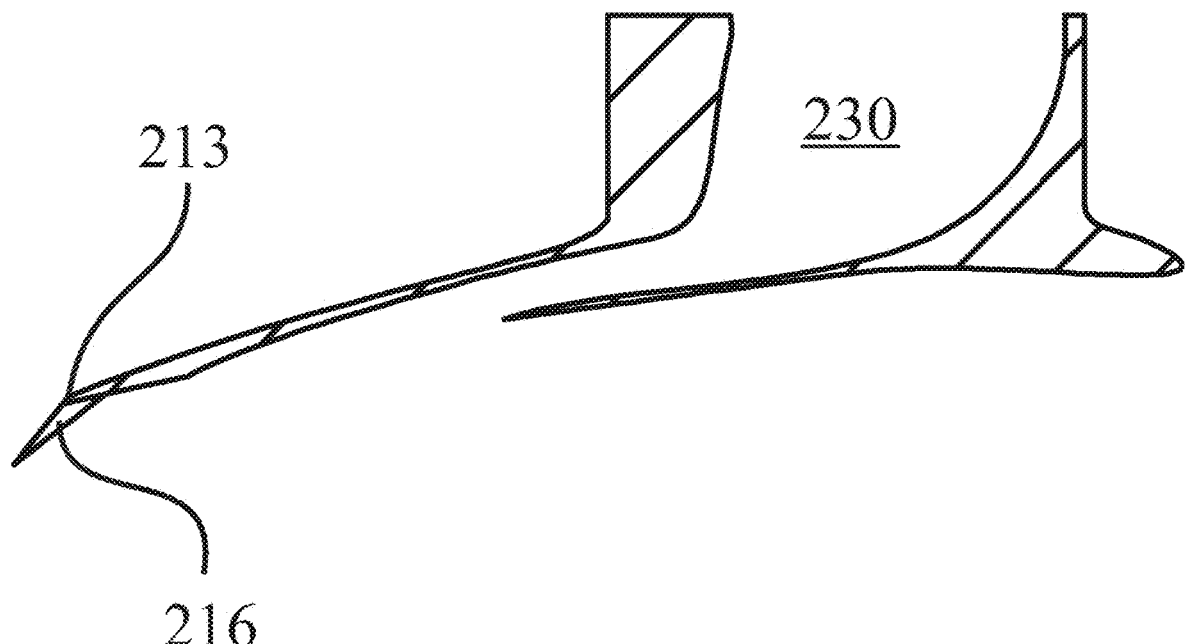

Without wishing to be bound by theory, it is believed that at higher forward velocities, fluid delivered to the concave region 225 by the channel 230 can increase the velocity of air moving under the lower surface 220, such that lift is reduced (generally applicable to the airfoils disclosed herein). One option to address this phenomenon is to reduce fluid flow through the channel 230 at higher forward velocities. Another option is to reduce the speed of the fluid travelling under the lower surface 220. FIGS. 14 and 15 illustrate a variation of the airfoil 200, airfoil 200*a* with an adjustable flap 216 operably connected to the trailing edge 213. FIG. 14 illustrates a perspective view of the airfoil 200*a* with the flap 216 downward oriented. FIG. 15 illustrates a cross-sectional slice of the airfoil 200*a*.

The concept of the flap 216 can be used with any of the airfoils disclosed herein.

In certain scenarios, air may separate from the upper surface 210, causing a reduction in lift. Even if air is not separating from the upper surface 210, it may be beneficial to increase the speed of the air flowing over the upper surface 210 to thereby reduce the pressure and increase the lift.

Figure 16:
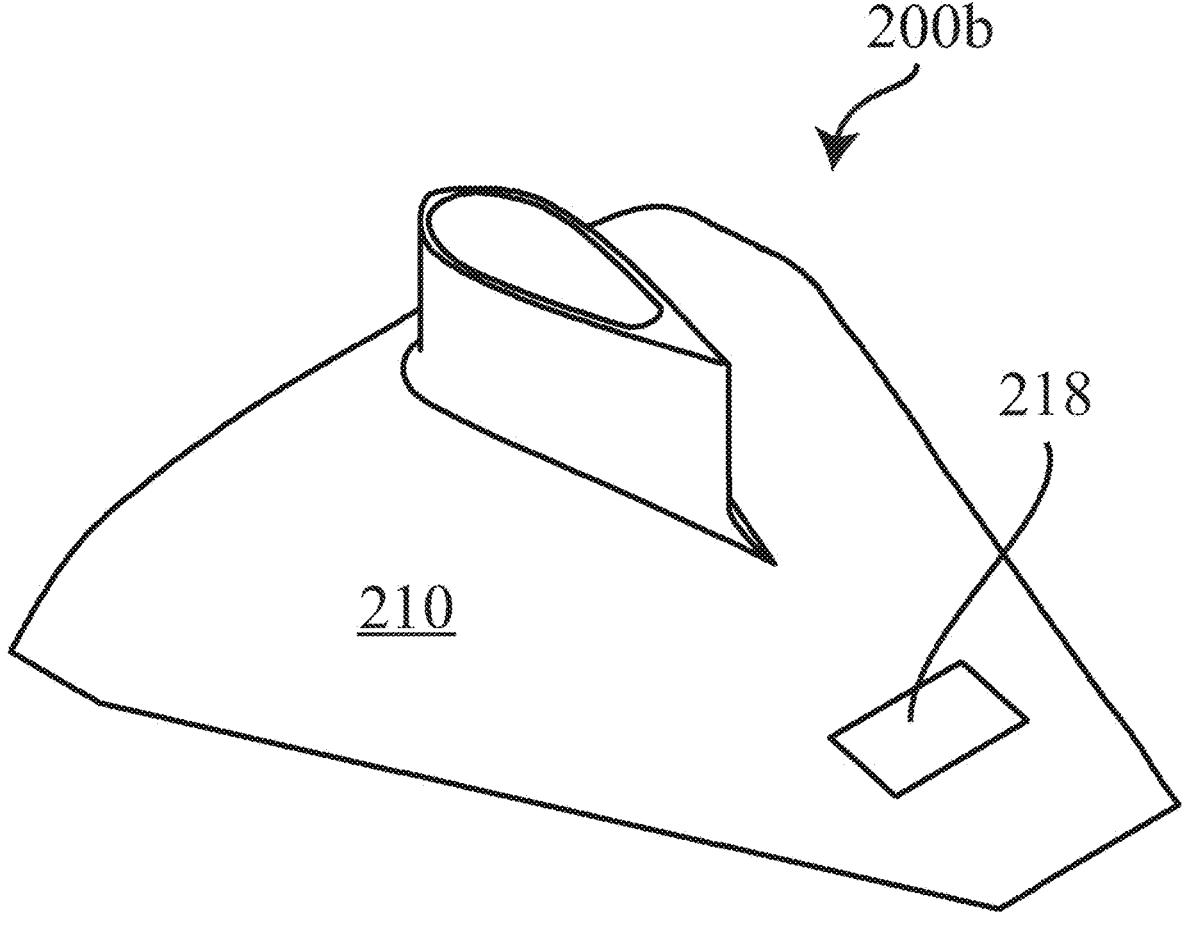
FIG. 16 illustrates a perspective view of one embodiment of an airfoil disclosed herein, airfoil 200b.
Figure 17:
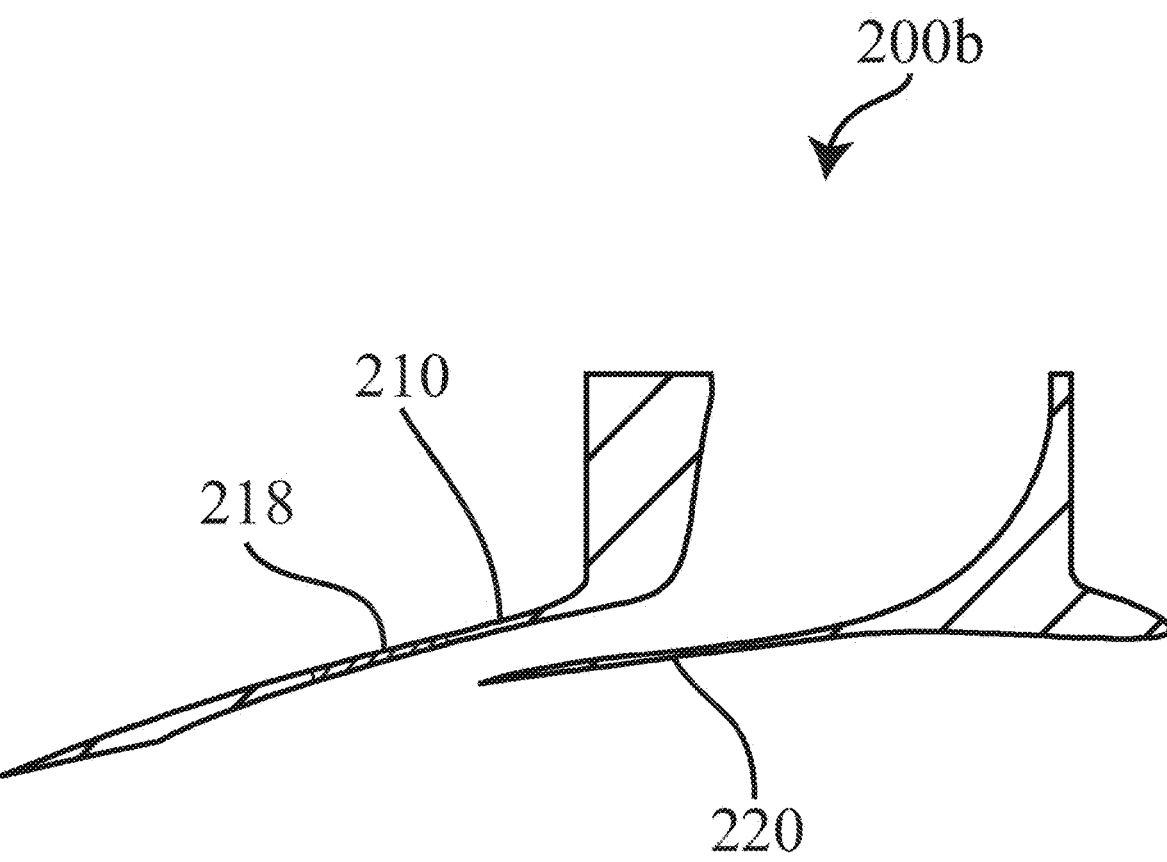
FIG. 17 illustrates a cross-sectional slice of the airfoil 200b with the vent 219 closed by the flap 218, taken along the lateral centerline of the airfoil 200b.
Figure 18:
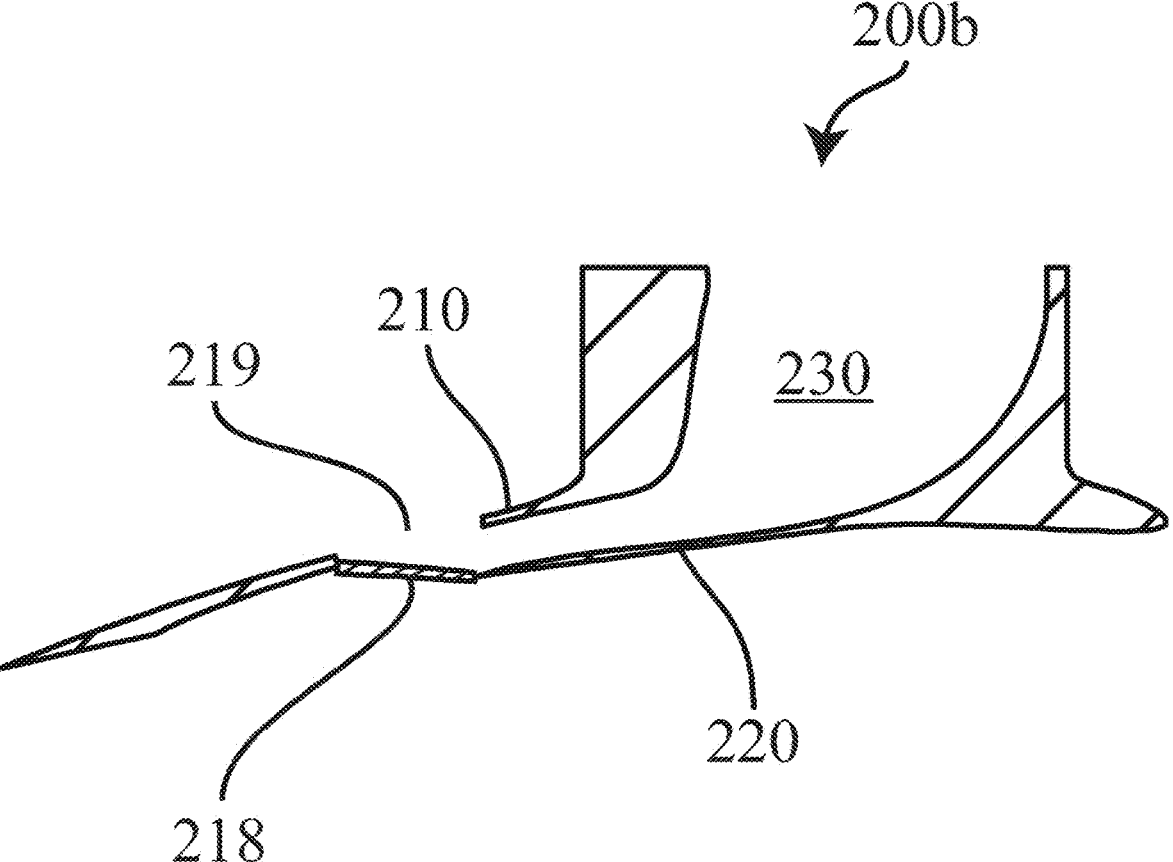
FIG. 18 illustrates a cross-sectional slice of the airfoil 200b with the vent 219 open, taken along the lateral centerline of the airfoil 200b.

FIGS. 16-18 illustrate a variation of the airfoil 200, airfoil 200*b* with an adjustable flap 218 and a vent 219. FIG. 16 illustrates a perspective view of one embodiment of an airfoil disclosed herein, airfoil 200*b*. FIG. 17 illustrates a cross-sectional slice of the airfoil 200*b* with the vent 219 closed by the flap 218, taken along the centerline of the airfoil 200*b*. FIG. 18 illustrates a cross-sectional slice of the airfoil 200*b* with the vent 219 open, taken along the centerline of the airfoil 200*b*. With the vent 219 open, fluid blown through the channel 230 is at least partially redirected out the vent 219 and over the upper surface 210.

The concept of the vent 219 may be implemented a number of different ways, such as multiple vents 219 located in the upper surface 210. Additionally, the flap 218 may only open outward, without occluding fluid flow in the channel 230.

Alternatively, the vent 219 could penetrate entirely through the airfoil 200, forming a separate channel from the lower surface 220 to the upper surface 210 without fluidically connecting with the channel 230. In that configuration, air present near the lower surface 220 could travel through the vent 219 and over the upper surface 210 (such as over the trailing portion of the upper surface 210), aiding in lift.

The concept of the vent 219 may be applied to any of the airfoil embodiments disclosed herein.

Figure 19:
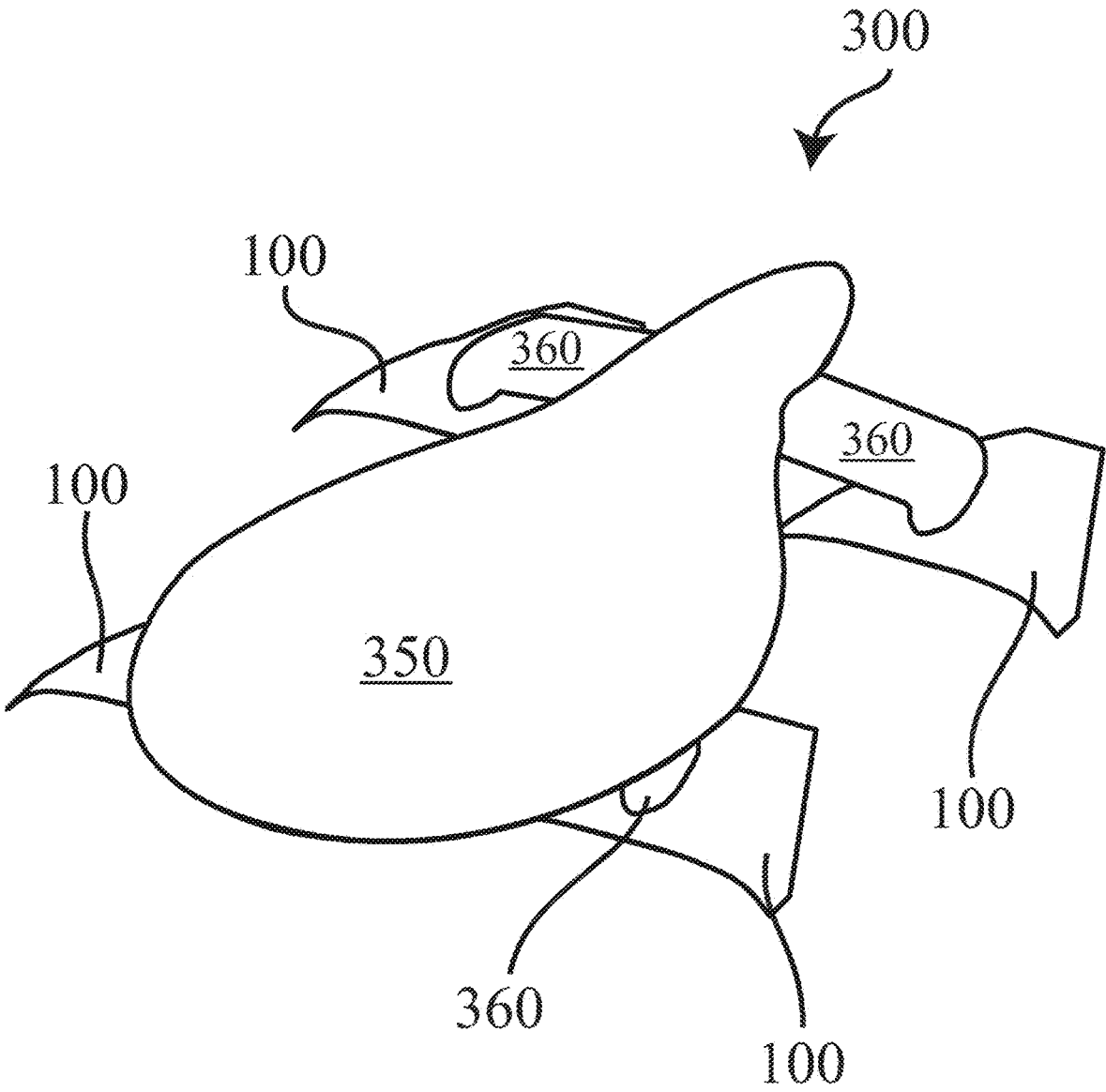
FIG. 19 illustrates a perspective view from above of one embodiment of a vehicle disclosed herein, vehicle 300.
Figure 20:
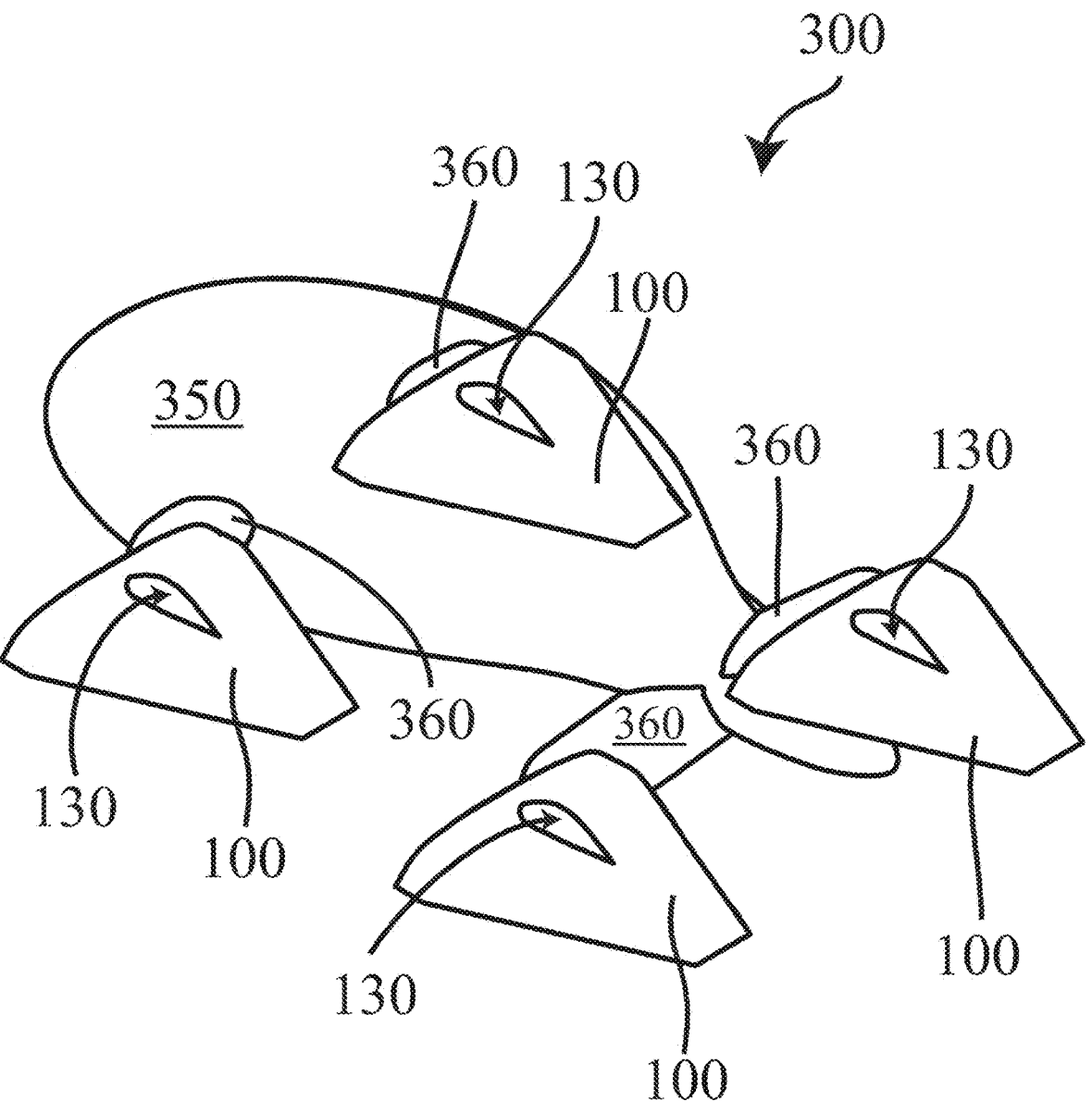
FIG. 20 illustrates an underneath perspective view of the vehicle 300 from below.

FIGS. 19-23 illustrate non-limiting generalized embodiments of vehicles incorporating the airfoil 100. FIG. 19 illustrates a perspective view of a vehicle 300 from above. FIG. 20 illustrates a perspective view of a vehicle 300 from below. The vehicle 300 includes an airframe 350 operatively connected to one or more blowers (not shown). The vehicle 300 includes four airfoils 100, two in the front and two in the back. Each airfoil 100 is rigidly secured to the airframe 350 via an aerotube 360 in fluidic communication with the one or more blowers (not shown) and with the channel 130 of each airfoil 100. Fluid supplied by the one or more blowers is blown through the channels 130, providing lift and allowing the vehicle 300 to hover. Forward propulsion provides forward movement for the vehicle 300.

Vehicle 300 could be configured for manned or unmanned operation. The vehicle 300 may be sized to accommodate a single pilot, two pilots, numerous passengers, relatively small cargo, palletized cargo, containerized cargo, or combinations of the foregoing.

Figure 21:
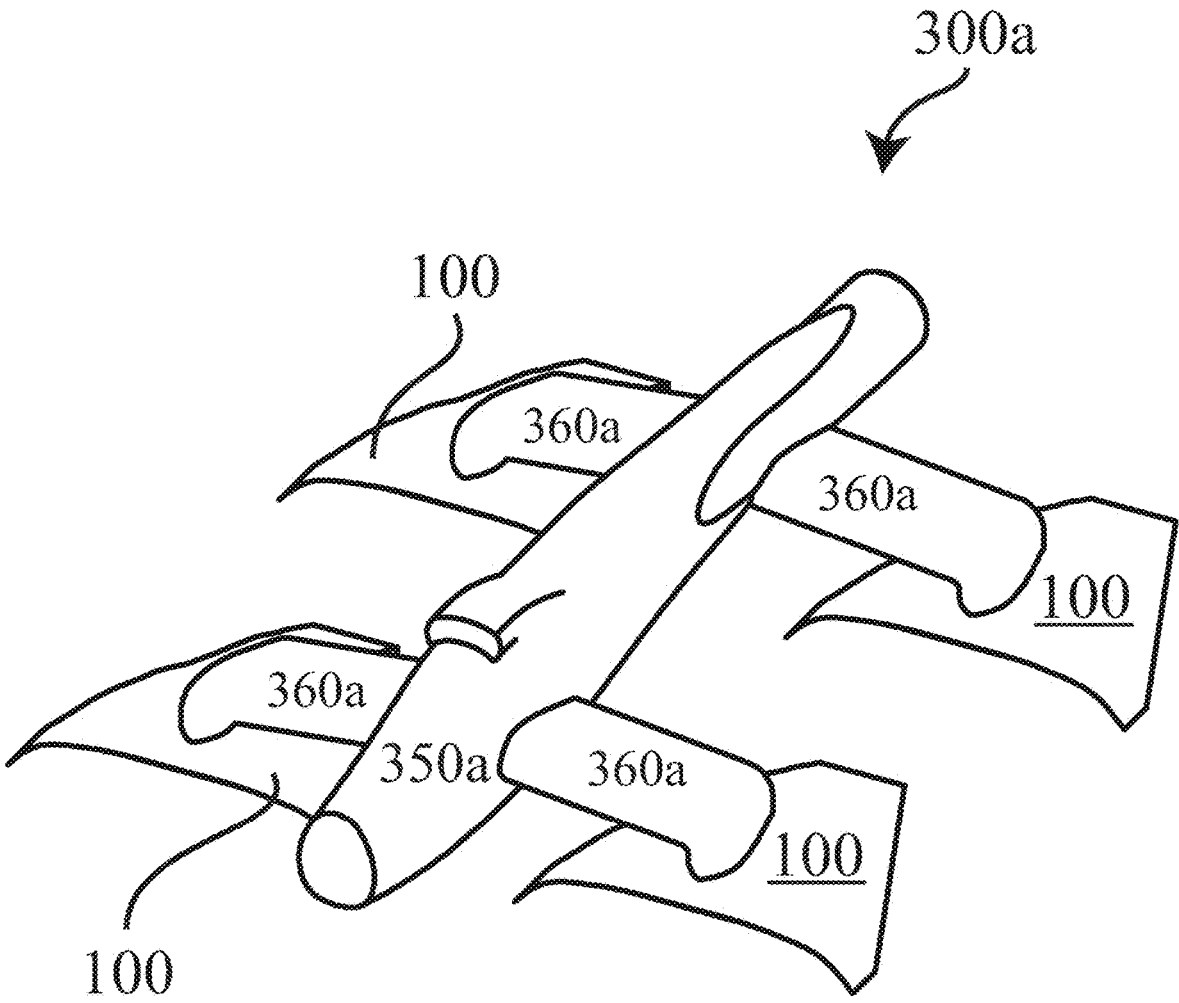
Figure 22:
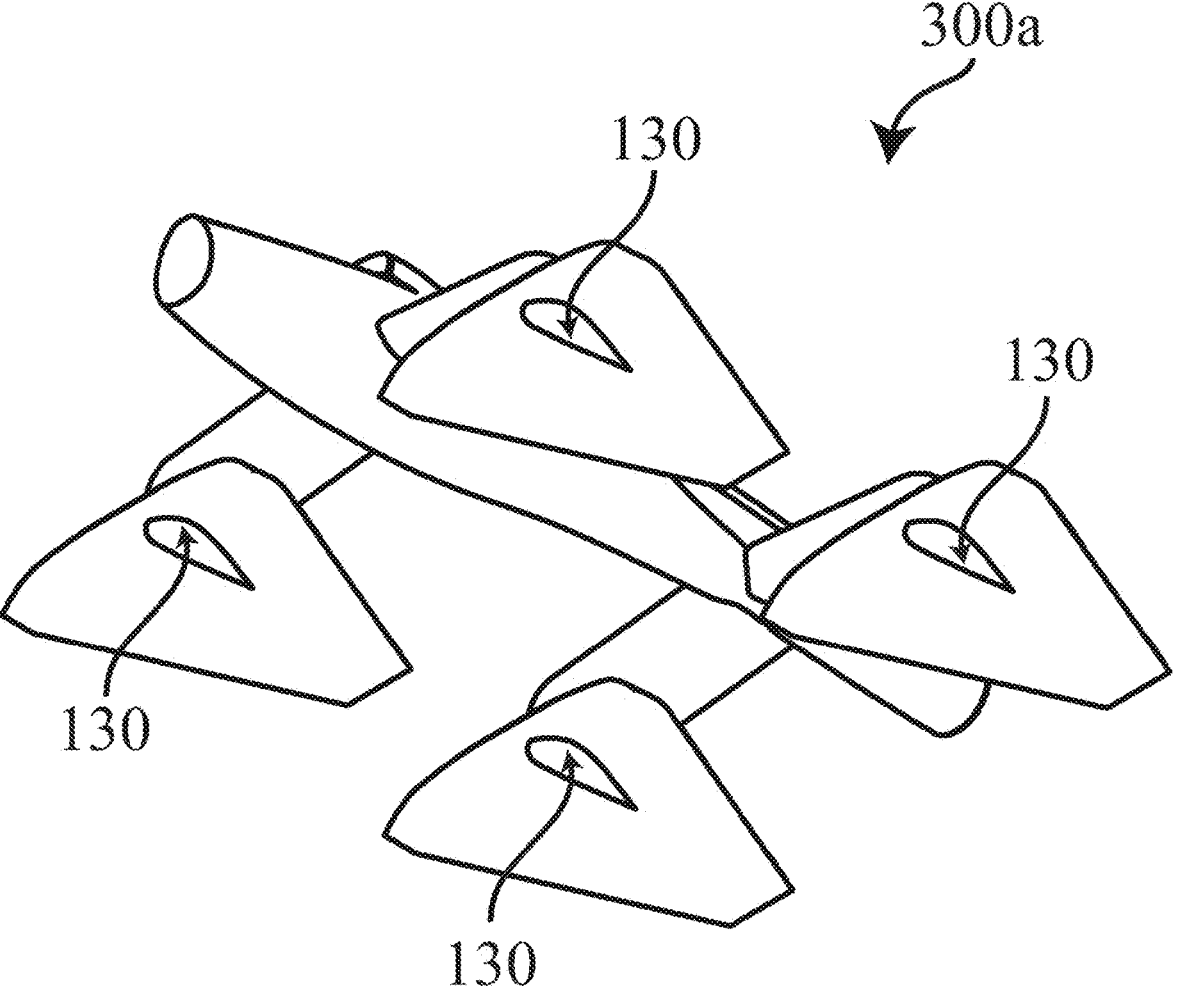
Figure 23:
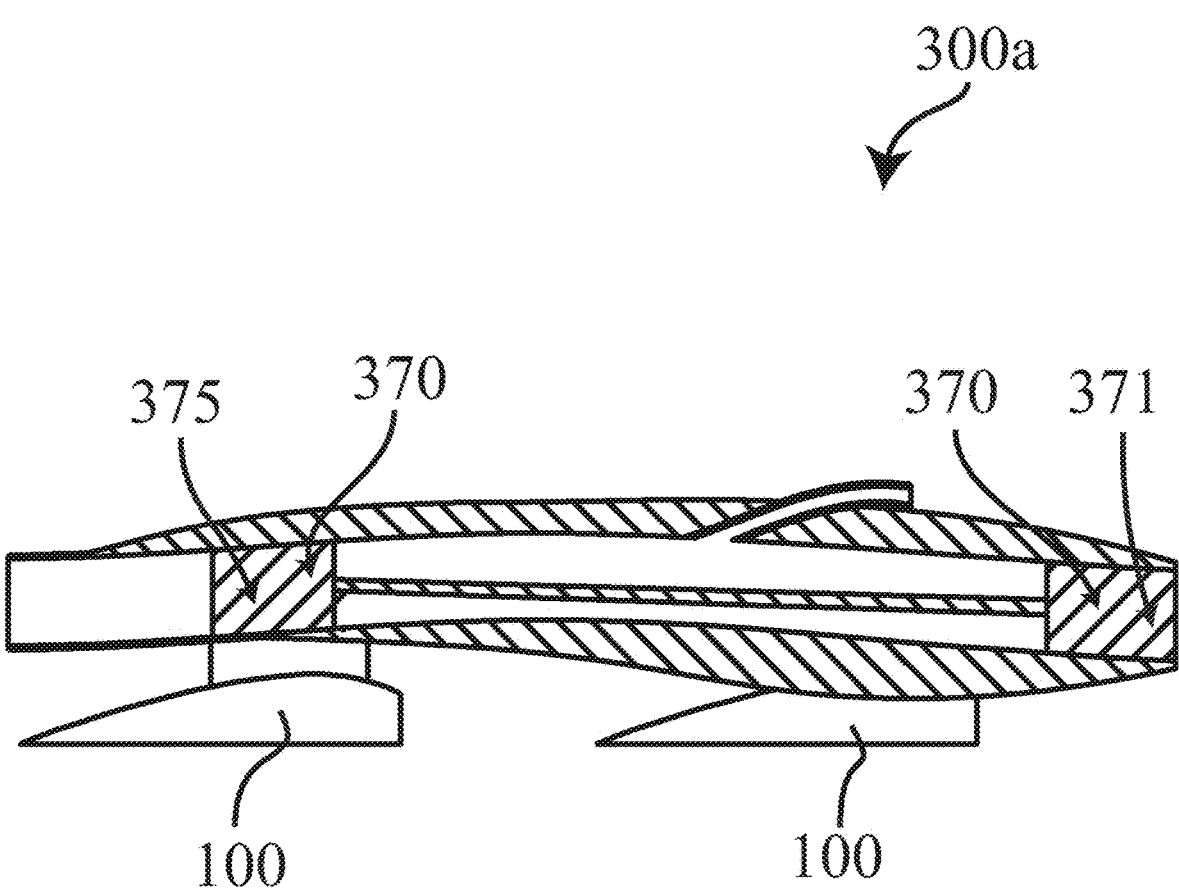
FIG. 23 illustrates a cross-sectional side view of the vehicle 300a taken along the lateral centerline.
Figure 24:
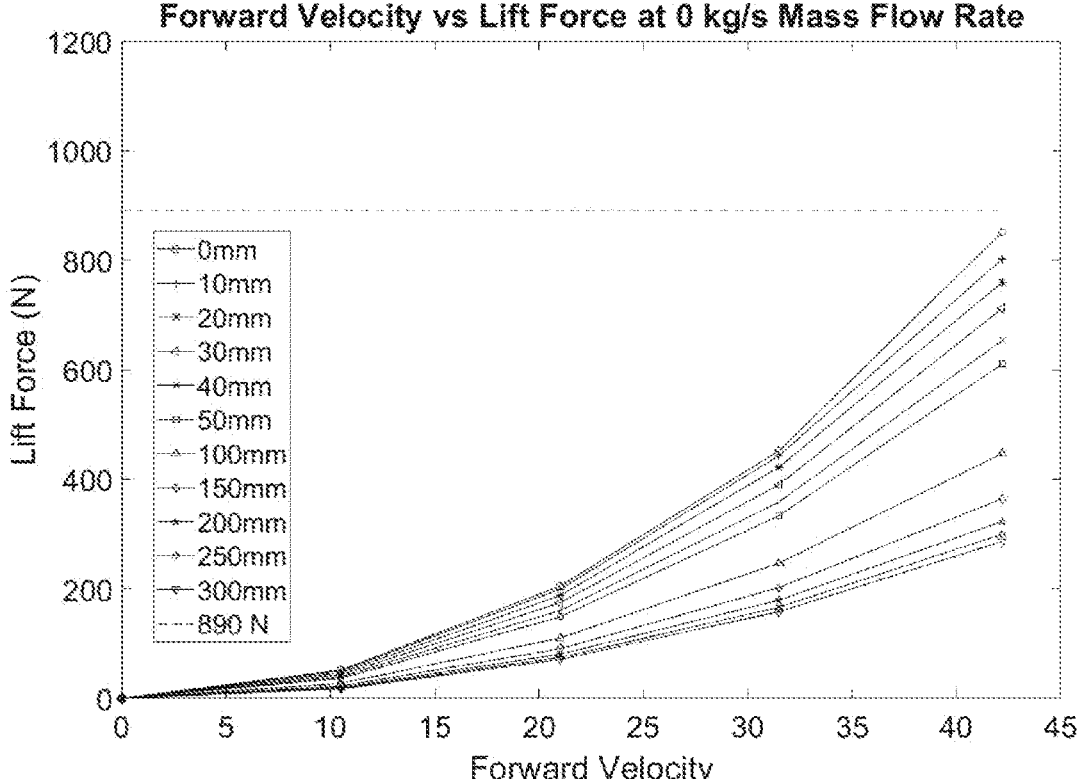

FIG. 21 illustrates a perspective view of a vehicle 300a from above. FIG. 22 illustrates a perspective view of a vehicle 300a from below. FIG. 23 illustrates a cross-sectional side view of the vehicle 300a taken along the centerline. The vehicle 300a includes four airfoils 100, two in the front and two in the back. Each airfoil 100 is rigidly secured to the airframe 350a via an aerotube 360a in fluidic communication with the blowers 370 and with the channel 130 of each airfoil 100. In this embodiment, the blowers 370 include a fan 371 mechanically driven by a jet turbine 375. Atmospheric air is drawn into the fan 371 and directed via the front two aerotubes 360a to the channels 130 of the adjacent front two airfoils 100. The fan 371 is driven by a shaft powered by the jet turbine 375. Atmospheric air and fuel are applied to the jet turbine 375. The jet turbine 375 includes a compressor (not separately illustrated). The compressor compresses the exhaust from the jet turbine 375 and is operably connected to the rear aerotubes 360a and rear two channels 130 of the rear airfoils 100. The compressed exhaust is directed through the channels 130. The air and exhaust supplied to the channels 130 provide lift, allowing the vehicle 300a to hover. The jet turbine 375 also provides propulsion for forward motion of the vehicle 300a.

The air supplied by the fan 371 through the forward channels 130 can be varied or entirely eliminated or closed off. Likewise, the exhaust supplied by the turbine 371 through the rear channels 130 can be varied and redirected, such as to aid forward propulsion.

A benefit of the design of the vehicle 300a is that a single propulsion system is used to provide both hover and forward motion. This can provide weight-to-thrust ratio benefits over designs that use separate hover and flight power systems (e.g., separate rotors for take-off and flight) or that require bulky equipment to rotate power equipment from hover mode to flight mode (e.g., motors for rotating rotors from take-off/landing mode to flight mode).

The propulsion system of vehicle 300a can also be used with vehicle 300.

The vehicle 300a can be sized to be ridden like a motorcycle or ATV. The controls, windshield, seats, etc. are not illustrated. The vehicle 300a can also be enlarged to accommodate one or more passengers, cargo, or both within the airframe 350a. As with the vehicle 300, the vehicle 300a can be configured for manned or unmanned operation.

A variety of power supplies could be used. For example, instead of jet fuel, the jet turbine could be electrically driven or hydrogen or natural gas powered. Hydrogen fuel cells or batteries could be used to provide electricity to electric motors.

A horizontal fan, such as a central centrifugal fan, could be used to supply airflow to the various airfoils 100. In that embodiment, a separate forward propulsion system would be required, such as externally-mounted rotors or turbines. For example, a drone could include a central compartment for storage of cargo. The central fan could be mounted above the central compartment and the airfoils mounted outside the central compartment. Likewise, a large-scale version of such a drone could be used to transport passengers (such as passengers waiting at a bus stop in a transparent cubical container) or shipping containers. Externally-mounted rotors or turbines could be used with any of the embodiments disclosed herein.

A vehicle utilizing the airfoils could be an exosuit worn by a single individual. For example, a mechanized exosuit could provide the airframe (e.g., a support framework along the arms, legs, and torso with mechanized joints) for supporting the airfoils, blowers, and power supply. A central fan or jet turbine could supply air or exhaust to airfoils mounted at the hands and feet (e.g., one airfoil for each hand and each foot).

In the illustrated vehicle embodiments, two airfoils are fluidically connected to a single blower 370 (e.g., fan 371 or jet turbine 375). In other embodiments a separate blower may be operably connected to each airfoil. Each airfoil could be structurally connected to the other airfoils, such as via a frame. However, individual airfoils could also be individually mounted to an object to be transported. For example, a storage container as it is being offloaded from a transport ship could be outfitted with temporary airfoils that each have their own blower and power supply (for example, a magnetic L-shaped bracket could secure the airfoil to a bottom edge of a steel shipping container). Separate power supplies and forward propulsion fans could also be magnetically attached to the shipping container. The shipping container could then be flown in ground effect over the water from the transport ship (anchored a distance from the port) to the port. The shipping container could potentially be flown/hovered directly to a distribution center.

In the illustrated vehicle embodiments, the airfoils are fixed to a vehicle. Optionally, the airfoils can be articulatable, such as illustrated in FIG. 25-29 with the attachment system 400. The attachment system 400 includes ball connection 410. Ball connection 400 includes hollow male and female members that allow the airfoil 100 to move independent of the rest of attachment system 400. For example, the angle of attack during takeoff could be adjusted. Additionally, the lateral angles (i.e., rotation) of individual or all of the airfoils could be adjusted to aid in steering a vehicle. The ability to freely pivot each airfoil 100 at the ball connection 410 may provide enhanced maneuverability when flying in ground effect, as compared to mono-wing-type ground effect vehicles. Articulation may allow each airfoil to act like an independent suspension.

Figure 25:
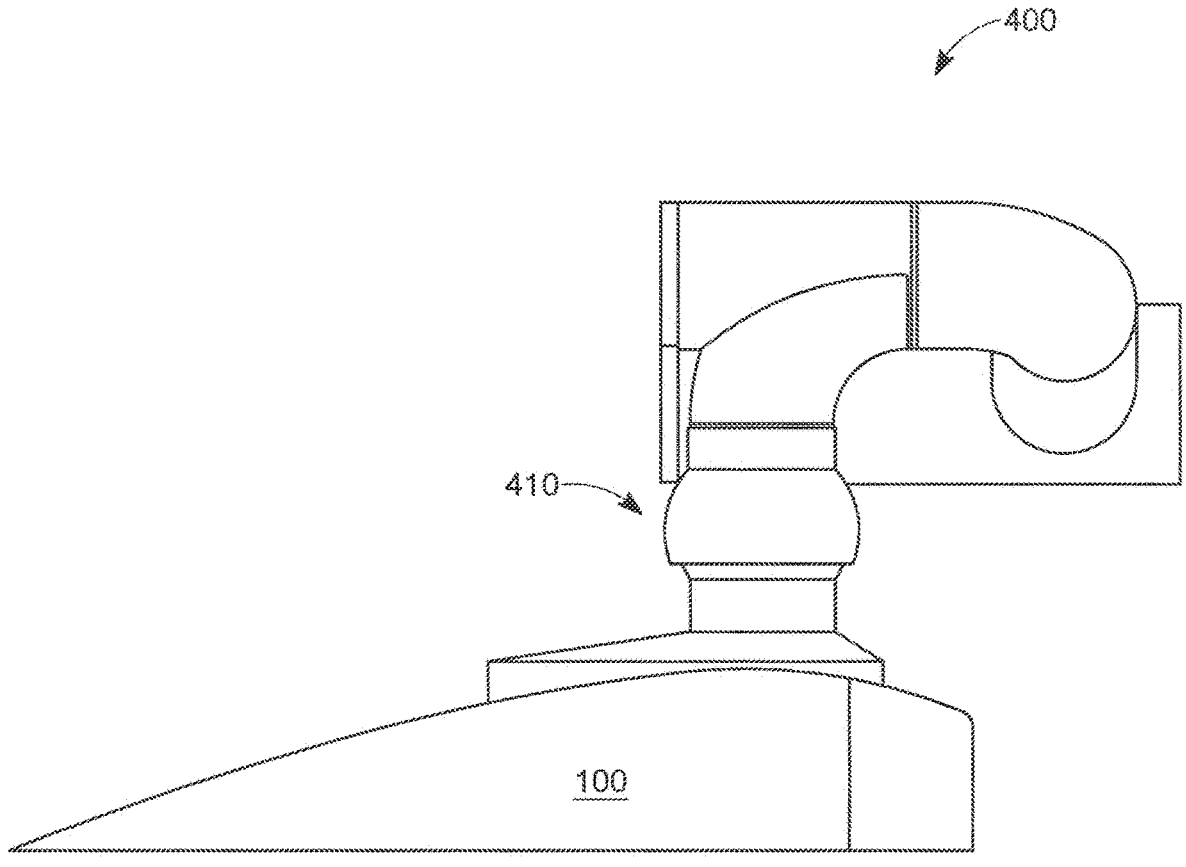
FIG. 25 illustrates a side view of one embodiment of an articulatable attachment system.
Figure 26:
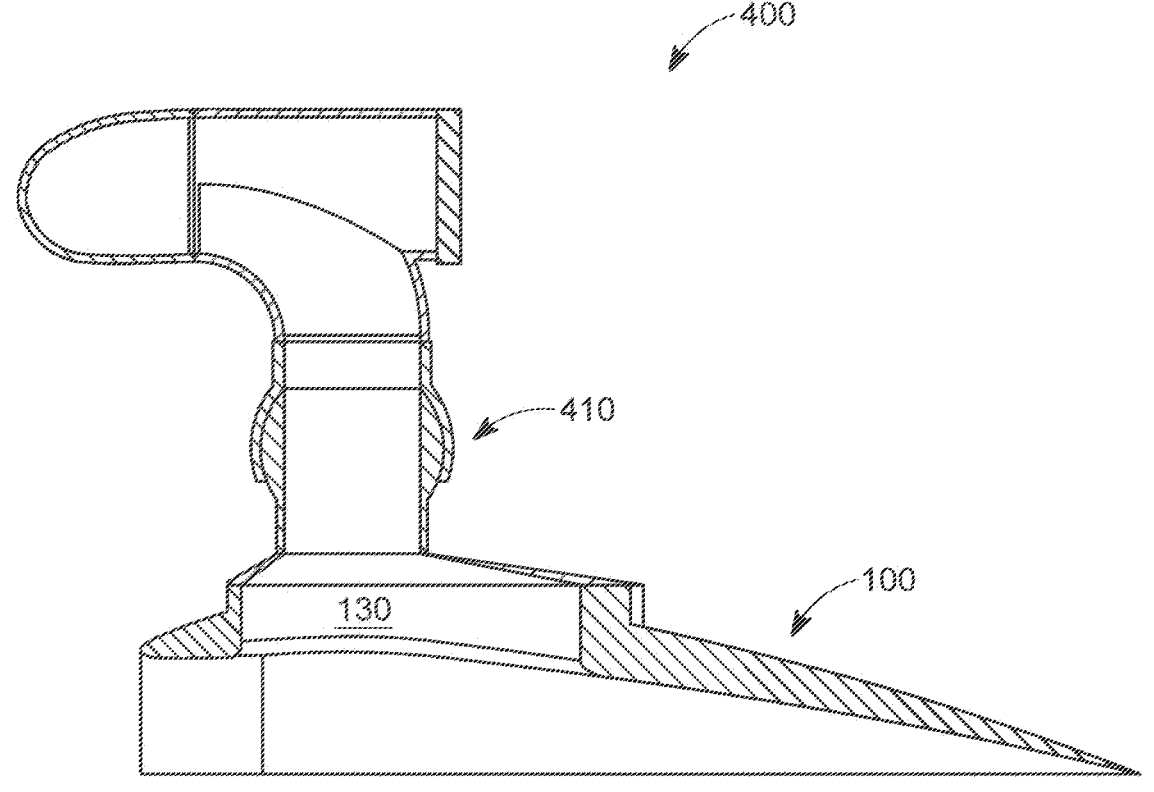
FIG. 26 illustrates a cross-section sideview of the articulatable attachment system of FIG. 25.
Figure 27:
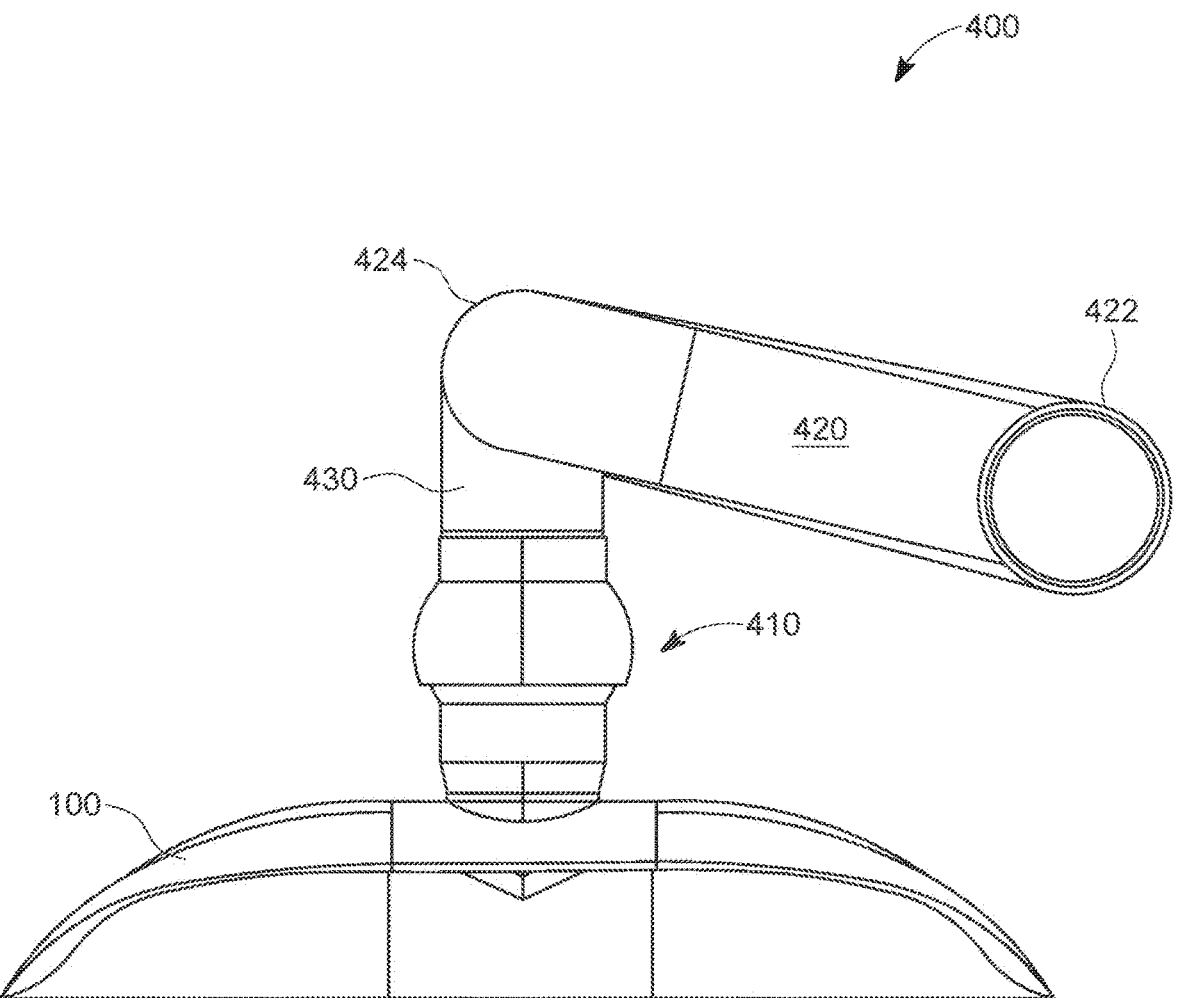
FIG. 27 illustrates a front view of the same.

FIG. 25 illustrates a side view of the attachment system 400. FIG. 26 illustrates a cross-section sideview of the ball connection 410 and the airfoil 100. FIG. 27 illustrates a front view of the attachment system 400 and illustrates the pivot aerotube 420 operably connected to the remainder of a vehicle (not shown) via first pivot 422. Pivot tube 420 is turn connected via second pivot 424 to aerotube 430. The connecting aerotubes 420 and 430 may adjust vertically, while the airfoil 100 adapts side-to-side and front-to-back to changing sea conditions. The individual airfoils may adapt to rough seas akin to how individual wheels of a dune buggy adapt to different surfaces.

Figure 28:
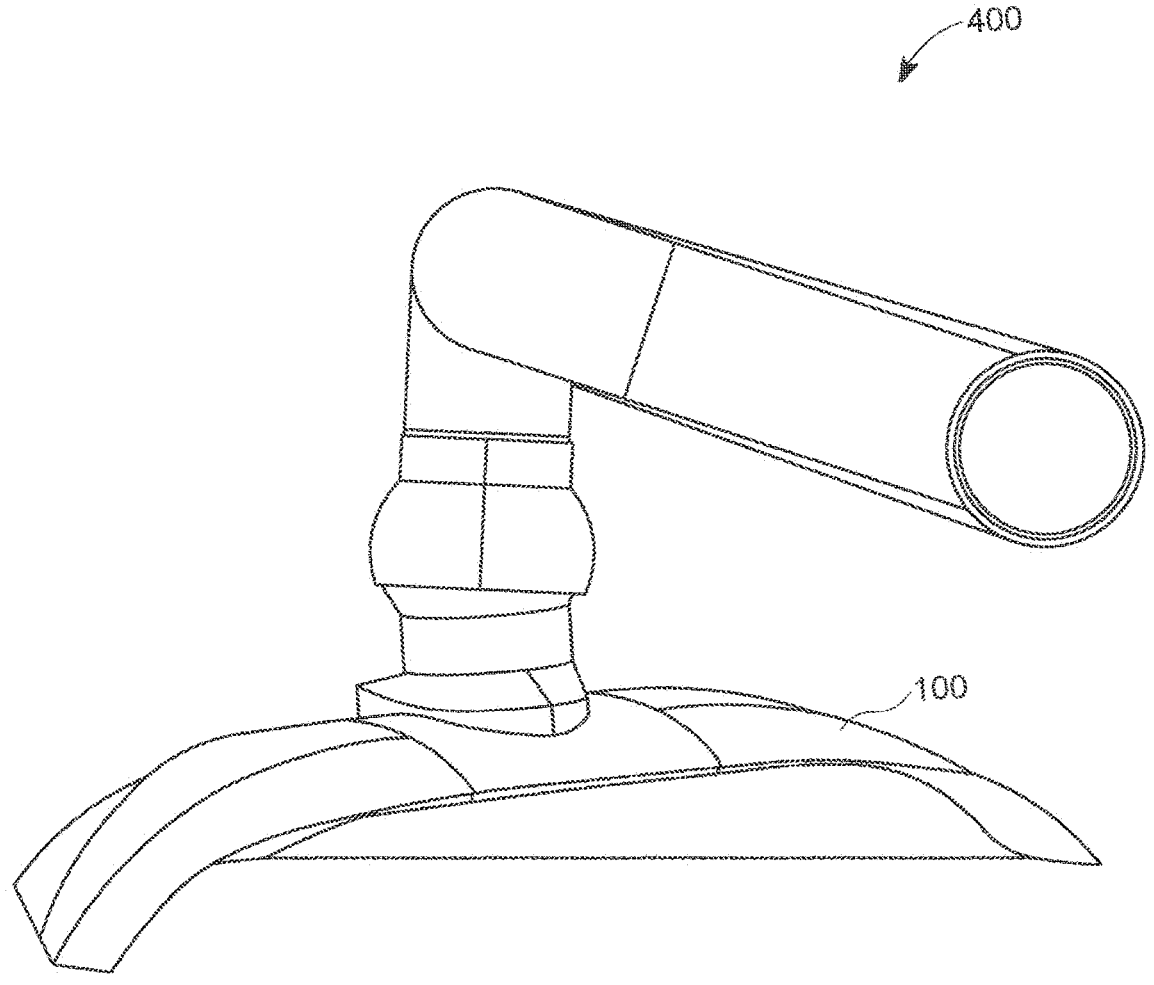
FIG. 28 depicts an airfoil angled upwards and rotated inward via the articulatable attachment system of FIG. 25.
Figure 29:
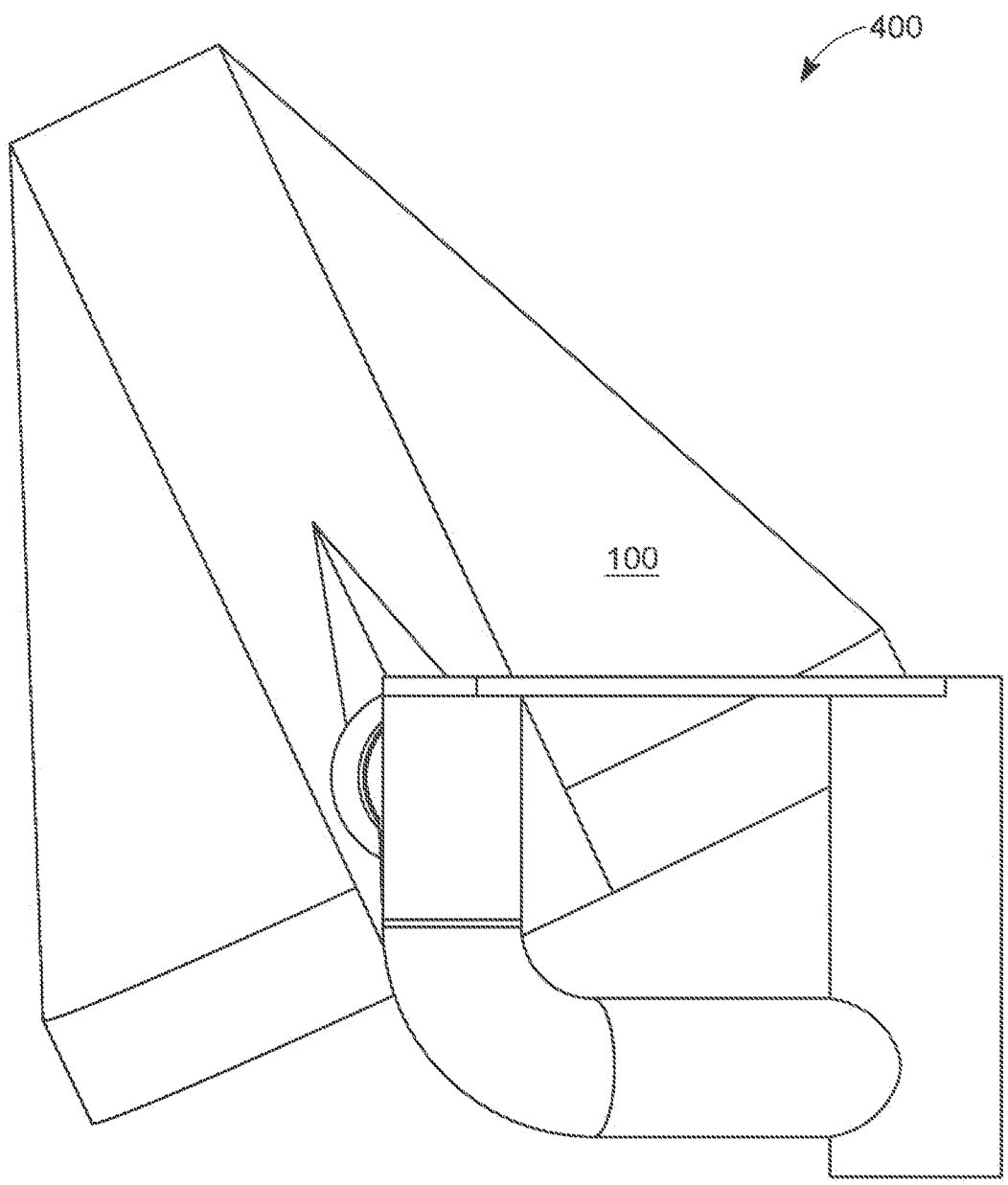
FIG. 29 depicts an overview an airfoil rotated inward via the articulatable attachment system of FIG. 25.

FIG. 28 depicts the airfoil 100 angled upwards and rotated inward. FIG. 29 depicts an overview the airfoil 100 rotated inward. A variety of actuators (e.g., electric, electromechanical, or hydraulic) may connect the airfoil 100 to aerotube 420, aerotube 430, or other components of a vehicle to enable movement of the airfoil 100 at ball connection 410.

In certain variations, the attachment system may not include pivot aerotube 420. Instead, the aerotube 430 may project directly from the fuselage of a vehicle and contain concentric cylindrical sections. Vertical movement may be accomplished by telescoping and retracting the cylindrical sections as needed.

In certain variations, the airfoils 100 may be configured to only rotate along a single plane, without the ability to angle upwards or downwards. In that variation, instead of the ball connection 410, the airfoil 100 may be operably connected to the aerotube 430 via a cylindrical bearing surface. The airfoil 100 may be rotated by a gear or chain drive connected to motor and operably connected to the cylindrical bearing surface. In the variation where the airfoil 100 is able to rotate only in a single plane, the airfoil may or may not be capable of vertical adjustment.

Vehicles utilizing the airfoils disclosed herein may have improved stability in ground effect compared to conventional ground effect vehicles. Having multiple airfoils may stabilize vehicles, as compared to a single airfoil.

The airfoils disclosed herein may be made of any material sufficiently strong and lightweight, such as fiberglass, carbon fiber, titanium, and/or aluminum. The upper and lower surfaces may be rigid. Alternatively, the upper and lower surfaces may have flexible regions. For example, at sufficient speeds, it may be desirable to change the shape of the airfoil to achieve a more conventional wing shape. The laterally arcuate shape of airfoil could be modulated with a piston and rod attached to the upper surface of the shroud, on each side lateral to the channel. As the pistons contract, the lateral concavity of the airfoil could be reduced. Additionally, the angle of attack of the airfoil could be adjusted by actuators operatively coupled to the airfoil and the airframe.

Vehicles including the airfoils disclosed herein could also include conventional wings. The conventional wings could be permanently extended from the airframe or could be selectably deployable. Deployment of the wings could occur by extension of retracted wing portions or by lowering wings kept in a vertical position.

Furthermore, the airfoils disclosed herein could function as landing gear, so to speak. Fluid could be blown through the channels of the airfoils during take-off, acceleration, deceleration, and landing. During flight, fluid flow through the channels could be blocked or directed to forward propulsion. The airfoils connections to the airframe could be designed to retract the airfoils within the airframe or rotate the airfoils up against the fuselage of the airframe.

The airfoils disclosed herein could also be configured to operate as a hovercraft. The opening underneath the airfoil could be removably blocked. For example, a front flap 116 could be pivotably attached to the leading edge 112. The front flap 116 could be configured to seal against the leading edge 112 when the front flap is extended downward (i.e., towards the ground). With the front flap extended downward and sealed against the leading edge 112, then air (or other gases) blown through the channel 130 would be trapped in the concave region 125. At sufficient pressure, the airfoil would lift until the air (or other gases) begin to escape around the bottom edges of the airfoil. With sufficient air flow through the channel 130 and into the concave region 125, the airfoil would hover on a cushion of air. The height of the hover would depend upon the pressure and airflow maintained in the concave region 125. A hover of 1-3 inches may be typical.

The front flap 116 could be pivoted horizontally, such as tucked up against the upper side of the lower surface 120, to allow the airfoil to function as a wing. Optionally, the front flap 116 could partially or completely block the channel 130 during flight, thereby preventing air blown through the channel 130 and/or atmospheric air drawn into the channel 130 during flight.

The front flap 116 could be a flexible material, such as woven (e.g., Kevlar) or non-woven material or a flexible solid material (e.g., a rubber), a rigid material (e.g., aluminum or carbon fiber), or a combination of both.

The front flap 116 could be configured to gradually pivot towards the upper side of the lower surface 120. For example, the position of the front flap 116 could be determined, at least partially, by the pressures experienced on the front and back of the front flap 116. As a vehicle accelerates forward, the pressure experienced on the front of the front flap 116 would eventually exceed the pressure experienced by the back of the flap. The front flap could be configured to passively pivot as pressures change. In this way, the pressure in the concave region 125 would not be lost as the airfoil transitions from hovercraft mode to flight mode.

Alternatively, movement of the front flap 116 could be actively controlled using actuators, such as electrical, electromechanical, and mechanical (e.g., springs) actuators.

Hovercraft operation could allow the airfoils to be used for land-based takeoff. This would allow for a number of possible uses. For example, hovercraft-capable ground effect vehicles could be used along roadways and railways. In particular, hovercraft-capable ground effect vehicles could be used to deliver high-speed prioritized cargo to kiosks established along railways. Much of the rural United States was established along old rail lines. The ability to deliver goods rapidly to kiosks in the rural United States could have significant economic benefits to rural communities.

The airfoils disclosed herein could also be configured for submersion. Air (or other gases) blown through the channel 130 would tend to evacuate water from the concave region 125. This could reduce the water in contact with the lower surface 120 of the airfoil, thereby reducing the drag experienced by the airfoil as the airfoil (and associated vehicle) accelerate. The airfoil would hydrofoil as the vehicle accelerates and then with sufficient speed, completely exit the water.

In some embodiments, the airfoils disclosed herein could be configured to operate from either submersion, in hovercraft mode, or both. By both is meant that the airfoils can be submerged and then rise out of the water in hovercraft mode when air is supplied via channel 130.

In some embodiments, a vehicle may only have one of the airfoils.

For maritime monitoring, the vehicle may include one or more airfoils with hovercraft mode capability. Hovercraft may be efficient from 0 to 60 knots. For maritime monitoring, the vehicle may stay in hovercraft mode and never transition to ground effect flight mode.

Maritime monitoring applications include acoustic monitoring, contaminant tracing, and dissolved gas testing. A sensor package, with suitable sensors, may be deployed from the vehicle when it is floating in the water. For example, a sensor package could be deployed by winch from a cargo hold on the vehicle. One benefit of the vehicles disclosed herein may be data quality. By being able to come to a complete stop and power down (other than perhaps telemetry equipment), in the case of sound data, electromagnetic interference is reduced and sound disturbance caused by water movement is reduced. By contrast, waver gliders and other autonomous surface vessels and autonomous underwater vessels are continuously moving. Their electronic systems and water movement interfere with acoustic data collection.

EXAMPLES

A vehicle comprising: an airframe operatively connected to one or more blowers; and an airfoil comprising an upper surface and a lower surface extending laterally along a leading edge to first and second arcuate wingtips defining a concave region bounded by the lower surface of the airfoil, wherein the airfoil is operatively connected to the airframe via the upper surface of the airfoil, wherein the airfoil comprises a channel extending from the upper surface to the lower surface of the airfoil, wherein the channel is in fluidic communication with at least one of the one or more blowers, and a moveable flap adjustably connected to the leading edge, wherein the moveable flap substantially seals against the leading edge when the flap is fully deployed and does not contact at least a portion of the leading edge when the flap is retracted.

The vehicle of paragraph [00108], wherein the moveable flap substantially seals against the lower surface of the airfoil when the flap is fully retracted The vehicle of paragraph [00108] or of paragraph [00109], wherein the vehicle comprises multiple airfoils.

The vehicle of any one of paragraphs [00108]-[00110], wherein fluid provided by the one or more blowers into the channel of the airfoil generates lift for the vehicle.

The vehicle of any one of paragraphs [00108]-[00111], wherein the airfoil further comprising a nozzle extending downward from the lower surface of the airfoil in fluidic communication with the channel of the airfoil.

The vehicle of paragraph [00112], wherein the nozzle for the airfoil is extendable and retractable.

The vehicle of any one of paragraphs [00108]-[00113], wherein the channel of the airfoil channel comprises a straight tube.

The vehicle of any one of paragraphs [00108]-[00113], wherein the channel of comprises a swept tube wherein a lower orifice of the channel is offset relative to an upper orifice of the channel.

The vehicle of any one of paragraphs [00108]-[00115], wherein the airfoil includes a selectively openable vent located in the upper surface of the airfoil and rearward of an upper orifice of the channel and wherein the vent is in fluidic communication with the channel, whereby when the vent is in an open position, fluid provided by the one or more blowers into the channels exits at least partially through the vent and over the upper surface of the airfoil and thereby generates lift for the vehicle.

The vehicle of any one of paragraphs [00108]-[00116], wherein a centerline of the airfoil has a stationary angle of attack of 5° to 25°, of 5° to 20°, of 5° to 15°, of 10° to 20°, or of 10° to 15°; OPTIONALLY, wherein the first and second arcuate wingtips have a stationary angle of attack of zero.

The vehicle of any one of paragraphs [00108]-[00117], wherein the airfoil is articulatable.

The vehicle of any one of paragraphs [00108]-[00117], wherein the airfoil is rigidly secured to the airframe via an aerotube in fluidic communication with the one or more blowers and with the channel of the airfoil.

The vehicle of any one of paragraphs [00108]-[00119], wherein one or two airfoils are operatively connected to a single blower and one or two airfoils are operatively connected to a second single blower.

The vehicle of any one of paragraphs [00108]-[00120], further comprising one or more turbines operatively connected to the one or more blowers.

The vehicle of any one of paragraphs [00108]-[00121], wherein materials making up the upper surface and the lower surface comprise rigid materials.

The vehicle of any one of paragraphs [00108]-[00122], wherein a lateral concavity of the concave region can be increased or decreased.

An airfoil comprising an upper surface and a lower surface extending laterally along a leading edge to first and second arcuate wingtips defining a concave region bounded by the lower surface of the airfoil, wherein the airfoil is operatively connected to the airframe via the upper surface of each airfoil, wherein the airfoil comprises a channel extending from the upper surface to the lower surface of the airfoil, wherein the channel is in fluidic communication with at least one of the one or more blowers, and a moveable flap adjustably connected to the leading edge, wherein the moveable flap substantially seals against the leading edge when the flap is fully deployed and does not contact at least a portion of the leading edge when the flap is retracted.

The airfoil of paragraph [00124], further comprising a nozzle extending downward from the lower surface of the airfoil in fluidic communication with the channel of the airfoil; OPTIONALLY, wherein the nozzle is extendable and retractable.

The airfoil of any one of paragraphs [00124]-[00125], wherein the channel comprises a straight tube.

The airfoil of any one of paragraphs [00124]-[00125], wherein the channel comprises a swept tube wherein a lower orifice of the channel is offset relative to an upper orifice of the channel.

The airfoil of any one of paragraphs [00124]-[00127], wherein the airfoil includes a selectively openable vent located in the upper surface of the airfoil and rearward of an upper orifice of the channel and wherein the vent is in fluidic communication with the channel, whereby when the vent is in an open position, fluid provided into the channels exits at least partially through the vent and over the upper surface of the airfoil.

The airfoil of any one of paragraphs [00124]-[00128], wherein a centerline of the airfoil has a stationary angle of attack of 5° to 25°, of 5° to 20°, of 5° to 15°, of 10° to 20°, or of 10° to 15°; OPTIONALLY, wherein the first and second arcuate wingtips have a stationary angle of attack of zero.

The airfoil of any one of paragraphs [00124]-[00129], wherein materials making up the upper surface and the lower surface comprise rigid materials.

The airfoil of any one of paragraphs [00124]-[00130], wherein a lateral concavity of the concave region can be increased or decreased.

The airfoil of any one of paragraphs [00124]-[00131], wherein the upper surface and the lower surface extend laterally to first and second arcuate wingtips defining a concave region bounded by the lower surface of the airfoil.

The airfoil of any one of paragraphs [00124]-[00132], wherein the moveable flap substantially seals against the lower surface of the airfoil when the flap is fully retracted.

A method of maritime monitoring, the method comprising providing a flying vehicle carrying a sensor assembly; flying the vehicle to a first destination and landing on the water; deploying the sensor assembly; conducting data acquisition; and flying the vehicle to a second destination and repeating the above steps according to a mission plan.

The method of paragraph [00134], further comprising coming to a complete stop after landing on the water.

The method of paragraph [00134] or paragraph [00135], further comprising powering down non-essential systems of the vehicle prior to data acquisition to reduce electromagnetic interference with the data acquisition.

The method of any one of paragraphs [00134]-[00136], wherein the second destination is at least 5 miles from the first destination.

The method of any one of paragraphs [00134]-[00137], repeating the method for multiple destinations at least 5 miles apart, according to the mission plan, without refueling or recharging the flying vehicle.

The method of any one of paragraphs [00134]-[00138], further comprising transmitting acquired data for data analysis after data acquisition.

The method of any one of paragraphs [00134]-[00139], further comprising, when a marine mammal is detected, deviating from the mission plan and flying in a direction of the detected marine mammal and repeating the method, and OPTIONALLY further comprising determining a position and bearing of the marine or repeating the steps until the position and bearing of the marine mammal has been triangulated.

The method any one of paragraphs [00134]-[00140], further comprising flying the vehicle in ground effect when flying in cruise to maximize range of the vehicle.

The method any one of paragraphs [00134]-[00141], further comprising landing and taking off from the water as a hovercraft.

The method of any one of paragraphs [00134]-[00142], wherein flying the vehicle comprises autonomously flying the vehicle, remotely flying the vehicle, or a combination of both.

It will be apparent to those having skill in the art that many changes may be made to the details of the above-described embodiments without departing from the underlying principles of the invention.

The invention claimed is:

1. A vehicle having a hovercraft mode and a flight mode, the vehicle comprising:
    at least an aerodynamically-modifiable airfoil comprising:
        an upper surface;
        a lower surface;
        at least one channel extending from the upper surface to the lower surface for introducing fluid underneath the lower surface of the airfoil; and a moveable flap configured to capture fluid introduced through the at least one channel when the moveable flap is deployed, thereby generating a cushion of fluid underneath the lower surface of the airfoil and providing a hovercraft mode for the vehicle, and the moveable flap configured to avoid generating the cushion of fluid underneath the lower surface of the airfoil when the moveable flap is undeployed, thereby providing a flight mode for the vehicle, wherein each airfoil of the at least an airfoil further comprising a nozzle extending downward from the lower surface of the airfoil in fluidic communication with the channel of the airfoil.

2. The vehicle of claim 1, further comprising one or more blowers operably connected to the at least one channel and configured to selectively introduce fluid underneath the lower surface of the airfoil.

3. The vehicle of claim 1, wherein the moveable flap is configured to parallel the lower surface of the airfoil when the moveable flap is undeployed.

4. The vehicle of claim 1, wherein the moveable flap is configured to tuck against the lower surface of the airfoil when not deployed.

5. The vehicle of claim 1, wherein the moveable flap is configured to at least partially block openings of the one or more channels in the lower surface of the airfoil.

6. The vehicle of claim 1, wherein the moveable flap comprises a flexible material.

7. The vehicle of claim 1, wherein the moveable flap comprises a rigid material.

8. The vehicle of claim 1, wherein deployment of the moveable flap is at least partially controlled by a pressure differential on opposing surfaces of the moveable flap.

9. The vehicle of claim 1, wherein:
    the airfoil has a forward edge and a rearward edge; and
    the moveable flap is attached to the rearward edge.

10. The vehicle of claim 1, wherein:
    the airfoil has a forward edge and a rearward edge;
    the channel has an opening in the lower surface; and
    the opening is oriented toward the rearward edge.

11. The vehicle of claim 1, wherein the nozzle for each airfoil is extendable and retractable.

12. The vehicle of claim 1, wherein the channel of each airfoil channel comprises a straight tube.

13. The vehicle of claim 1, wherein the channel of each airfoil channel comprises a swept tube wherein a lower orifice of the channel is offset relative to an upper orifice of the channel.

14. The vehicle of claim 1, wherein the at least an airfoil further comprises a plurality of airfoils.

15. The vehicle of claim 14, wherein the plurality of airfoils further comprises three airfoils.

16. A vehicle having a hovercraft mode and a flight mode, the vehicle comprising:
    at least an aerodynamically-modifiable airfoil comprising:
    an upper surface;
    a lower surface;
    at least one channel extending from the upper surface to the lower surface for introducing fluid underneath the lower surface of the airfoil; and
    a moveable flap configured to capture fluid introduced through the at least one channel when the moveable flap is deployed, thereby generating a cushion of fluid underneath the lower surface of the airfoil and providing a hovercraft mode for the vehicle, and the moveable flap configured to avoid generating the cushion of fluid underneath the lower surface of the airfoil when the moveable flap is undeployed, thereby providing a flight mode for the vehicle, wherein each airfoil includes a selectively openable vent located in the upper surface of the airfoil and rearward of an upper orifice of the channel and wherein the vent is in fluidic communication with the channel, whereby when the vent is in an open position, fluid provided by the one or more blowers into the channels exits at least partially through the vent and over the upper surface of the airfoil and thereby generates lift for the vehicle.

17. The vehicle of claim 16, wherein each airfoil of the at least an airfoil further comprising a nozzle extending downward from the lower surface of the airfoil in fluidic communication with the channel of the airfoil.

18. The vehicle of claim 17, wherein the nozzle for each airfoil is extendable and retractable.

19. A method of hovering a vehicle, the method comprising:

providing at least an aerodynamically modifiable airfoil, wherein the at least an airfoil comprises:
  an upper surface;
  a lower surface;

at least one channel extending from the upper surface to the lower surface for introducing fluid underneath the lower surface of the airfoil; and
a moveable flap configured to capture fluid introduced through the at least one channel when the moveable flap is deployed, thereby generating a cushion of fluid underneath the lower surface of the airfoil and providing a hovercraft mode for the vehicle, and the moveable flap configured to avoid generating the cushion of fluid underneath the lower surface of the airfoil when the moveable flap is undeployed, thereby providing a flight mode for the vehicle, wherein each airfoil of the at least an airfoil further comprising a nozzle extending downward from the lower surface of the airfoil in fluidic communication with the channel of the airfoil; and blowing a fluid through a channel extending from an upper surface to a lower surface of an airfoil with sufficient volume and pressure to lift the vehicle off of a surface.

20. The vehicle of claim 19, wherein the nozzle for each airfoil is extendable and retractable.

* * * * *